US012811866B2

(12) United States Patent
Kim et al.

(10) Patent No.: US 12,811,866 B2
(45) Date of Patent: Nov. 24, 2026

(54) METHOD AND APPARATUS FOR LINK MONITORING IN A WIRELESS COMMUNICATION SYSTEM

(71) Applicant: LG ELECTRONICS INC., Seoul (KR)

(72) Inventors: Myoungsoo Kim, Seoul (KR); Sunghoon Jung, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 18/692,726

(22) PCT Filed: Oct. 7, 2022

(86) PCT No.: PCT/KR2022/015163
§ 371 (c)(1),
(2) Date: Mar. 15, 2024

(87) PCT Pub. No.: WO2023/063659
PCT Pub. Date: Apr. 20, 2023

(65) Prior Publication Data

US 2024/0388516 A1 Nov. 21, 2024

(30) Foreign Application Priority Data

Oct. 15, 2021 (KR) ........................ 10-2021-0137741

(51) Int. Cl.
*H04L 43/0811* (2022.01)
*H04W 24/08* (2009.01)
(Continued)

(52) U.S. Cl.
CPC ......... *H04L 43/0811* (2013.01); *H04W 24/08* (2013.01); *H04W 56/0015* (2013.01); *H04W 76/20* (2018.02)

(58) Field of Classification Search
CPC . H04W 24/08; H04W 56/0015; H04W 76/15; H04W 76/18; H04W 76/19;
(Continued)

(56) References Cited

U.S. PATENT DOCUMENTS

2019/0357291 A1* 11/2019 Zhou ..................... H04W 76/19
2020/0059397 A1* 2/2020 da Silva .............. H04L 41/0654
(Continued)

FOREIGN PATENT DOCUMENTS

EP 3886528 9/2021

OTHER PUBLICATIONS

European Patent Office Application Serial No. 22881288.9, Search Report dated Aug. 5, 2025, 12 pages.
(Continued)

*Primary Examiner* — Benjamin H Elliott, IV
(74) *Attorney, Agent, or Firm* — LEE, HONG, DEGERMAN, KANG & WAIMEY

(57) ABSTRACT

A method and apparatus for link monitoring in a wireless communication system is provided. A wireless device may receive a link monitoring configuration for measurements of a cell group. The link monitoring configuration may include (i) a first index of a first radio resource, (ii) a first purpose related to the first radio resource for an activated state, and (iii) a second purpose related to the first radio resource for a deactivated state. A wireless device may perform link monitoring for the first radio resource based on the specific purpose.

13 Claims, 22 Drawing Sheets

(51) Int. Cl.
*H04W 56/00* (2009.01)
*H04W 76/20* (2018.01)

(58) Field of Classification Search
CPC ..... H04W 76/20; H04W 76/25; H04W 76/27; H04W 72/23; H04L 43/0811; H04L 5/005; H04L 5/0053; H04L 5/0098; H04B 7/06964
See application file for complete search history.

(56) References Cited

U.S. PATENT DOCUMENTS

| | | | | |
|---|---|---|---|---|
| 2022/0109547 | A1* | 4/2022 | Svedman | H04W 76/19 |
| 2022/0225457 | A1* | 7/2022 | Purkayastha | H04W 76/15 |
| 2023/0284145 | A1* | 9/2023 | Da Silva | H04W 52/0235<br>370/311 |
| 2023/0371104 | A1* | 11/2023 | Purkayastha | H04W 76/15 |
| 2023/0422332 | A1* | 12/2023 | Cirik | H04W 24/08 |
| 2024/0090067 | A1* | 3/2024 | Matsumura | H04L 5/0048 |
| 2024/0172311 | A1* | 5/2024 | Harada | H04B 7/06964 |
| 2024/0388516 | A1* | 11/2024 | Kim | H04L 5/0053 |

OTHER PUBLICATIONS

Huawei et al., "Correction to NR TC 7.1.1.1.4—Beam Failure," R5-201134, 3GPP TSG-RAN5 Meeting #86-e, Electronic Meeting, Mar. 2020, 19 pages.
Huawei et al., "Discussion on SCG deactivation and activation," R2-2010124, 3GPP TSG-RAN WG2 Meeting #112-e, Online, Oct. 2020, 6 pages.
PCT International Application No. PCT/KR2022/015163, International Search Report dated Jan. 16, 2023, 3 pages.
"5G; NR; Radio Resource Control (RRC); Protocol specification (3GPP TS 38.331 version 16.6.0 Release 16)," ETSI TS 138 331 V16.6.0, Oct. 2021, 950 pages.
Huawei, "[AT115-e][223][R17 DCCA] Network-triggered SCG activation (Huawei)," R2-2108865, 3GPP TSG-RAN WG2#115-e, Online, Aug. 2021, 16 pages.
Futurewei, "RRM and RLM/RLF handling for deactivated SCG," R2-2105011, 3GPP TSG-RAN WG2 Meeting #114-e, E-Conference, May 2021, 6 pages.
Ericsson, "UE measurements and reporting in deactivated SCG," R2-2103808, 3GPP TSG-RAN WG2 #113bis-e, Electronic meeting, Apr. 2021, 12 pages.

* cited by examiner

METHOD AND APPARATUS FOR LINK MONITORING IN A WIRELESS COMMUNICATION SYSTEM

CROSS-REFERENCE TO RELATED APPLICATION(S)

This application is the National Stage filing under 35 U.S.C. 371 of International Application No. PCT/KR2022/015163, filed on Oct. 7, 2022, which claims the benefit of earlier filing date and right of priority to Korean Application No. 10-2021-0137741, filed on Oct. 15, 2021, the contents of which are all hereby incorporated by reference herein in their entireties.

TECHNICAL FIELD

The present disclosure relates to a method and apparatus for link monitoring in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

[In NR, the UE may perform radio link monitoring (RLM) using radio resource(s) (for example, reference signal(s)) corresponding to resource indexes, which is provided by radio link monitoring reference signal(s) for the active DL BWP.

For a UE configured with Master Cell Group (MCG) and Secondary Cell Group (SCG), Radio link monitoring reference signal(s) could be configured in each CG configuration, and the UE may perform RLM using the reference signal(s) based on purpose of each reference signal in the configuration. The purpose of radio monitoring may be one of radio link failure, beam failure, or both.

In addition, in NR, the UE could deactivate SCG for power saving. While the SCG is deactivated, the UE may keep radio link monitoring to check if the SCG is usable. If the SCG failure is detected, the UE may need to report the failure to network via MCG or to perform recovery procedure.

Since the radio link monitoring requires a consistent UE power consumption, more power-efficient radio link monitoring is beneficial for deactivated SCG. Since link or beam failure report may require extra UE power consumption for uplink transmission, selective reference signal(s) for deactivated SCG may be beneficial for power saving.

Therefore, studies for link monitoring in a wireless communication system are required.

In an aspect, a method performed by a wireless device in a wireless communication system is provided. A wireless device may receive a link monitoring configuration for measurements of a cell group. The link monitoring configuration may include (i) a first index of a first radio resource, (ii) a first purpose related to the first radio resource for an activated state, and (iii) a second purpose related to the first radio resource for a deactivated state. A wireless device may perform link monitoring for the first radio resource based on the specific purpose.

In another aspect, an apparatus for implementing the above method is provided.

The present disclosure can have various advantageous effects.

According to some embodiments of the present disclosure, a wireless device could save power by performing selective link monitoring.

For example, the selective resource set(s) (for example, the selective reference signal(s)) for deactivated SCG may be beneficial for power saving.

In other words, the UE may selectively perform monitoring or measurement radio resource(s), and may not perform monitoring and measurement radio resource(s) depending on the purpose.

In particular, from the RRC signaling point of view, configuring two purposes of each radio resource used according to a UE state or a network command(s) could be more efficient than configuring multiple radio resource sets (or multiple reference signal sets) for multiple purposes.

That is, according to the present disclosure, in deactivated state, power-saving could be possible by reducing the number of beam failure (BF) detection and/or radio link failure (RLF) detection.

According to some embodiments of the present disclosure, a wireless communication system could provide an efficient solution for selective link monitoring.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
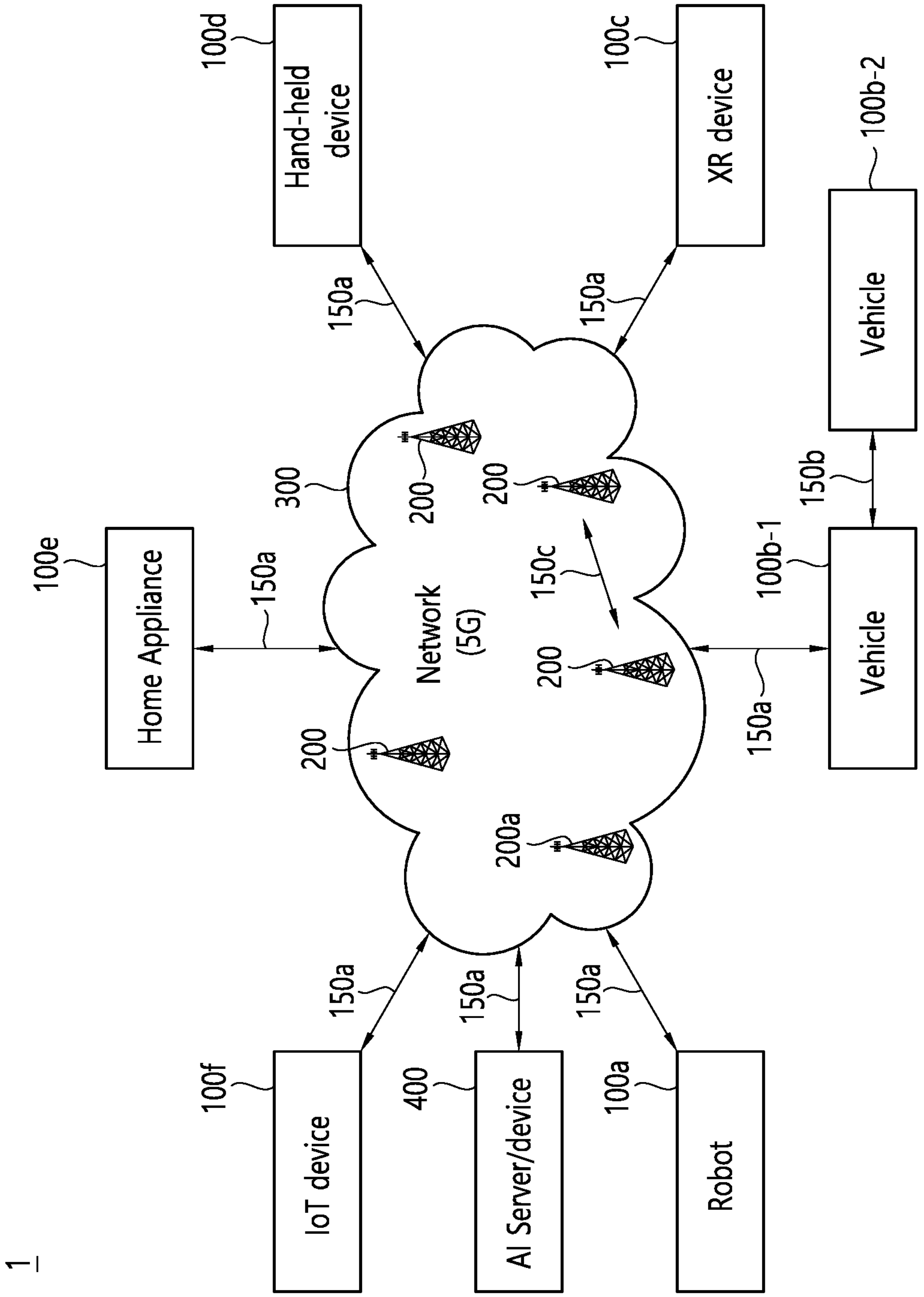
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure. "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly. "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used. 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*. 150*b* and 150*c*. For example, the wireless communication/connections 150*a*. 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example. ZigBee technology may generate personal area networks (PANs) associated with small/low-power digital communication based on various specifications such as IEEE 802.15.4 and may be called various names.

Figure 2:
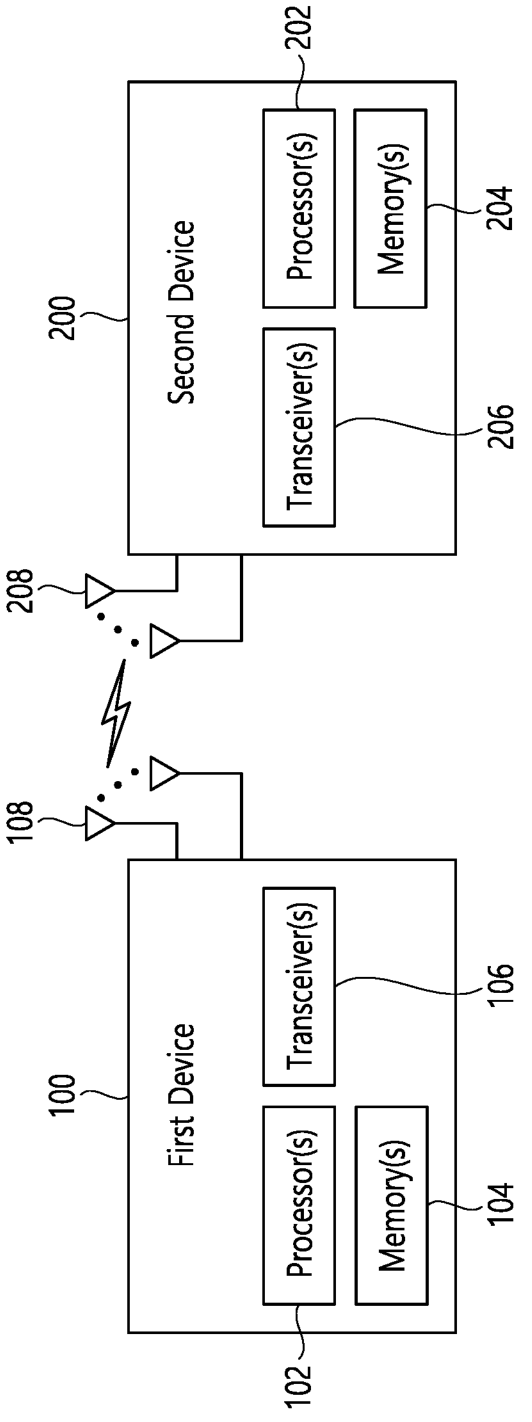
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
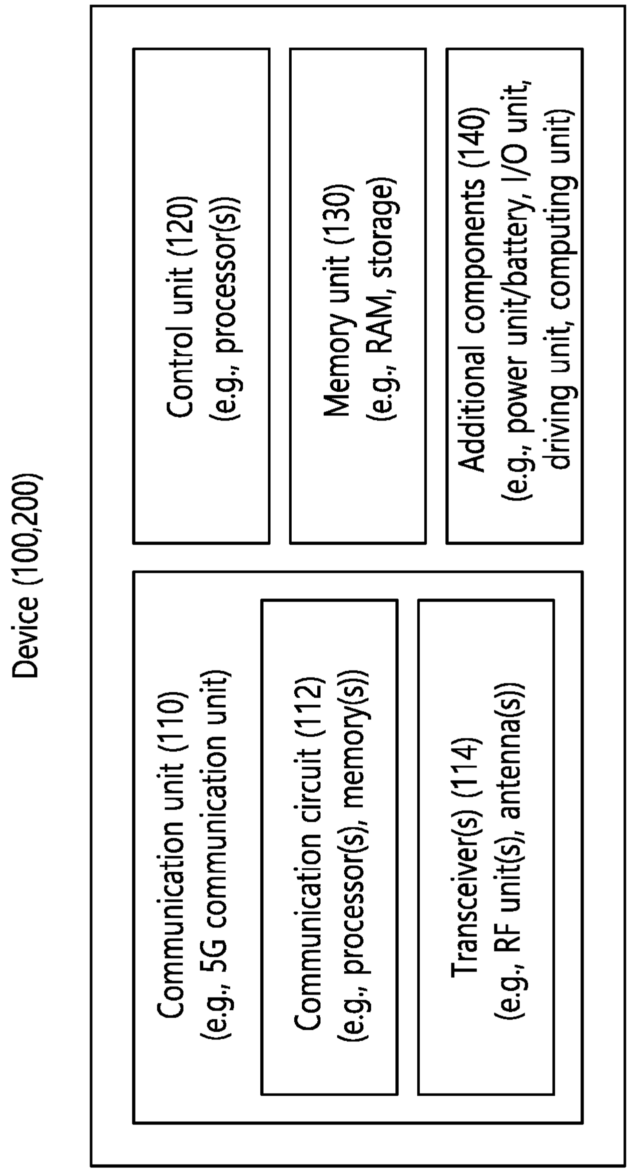
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
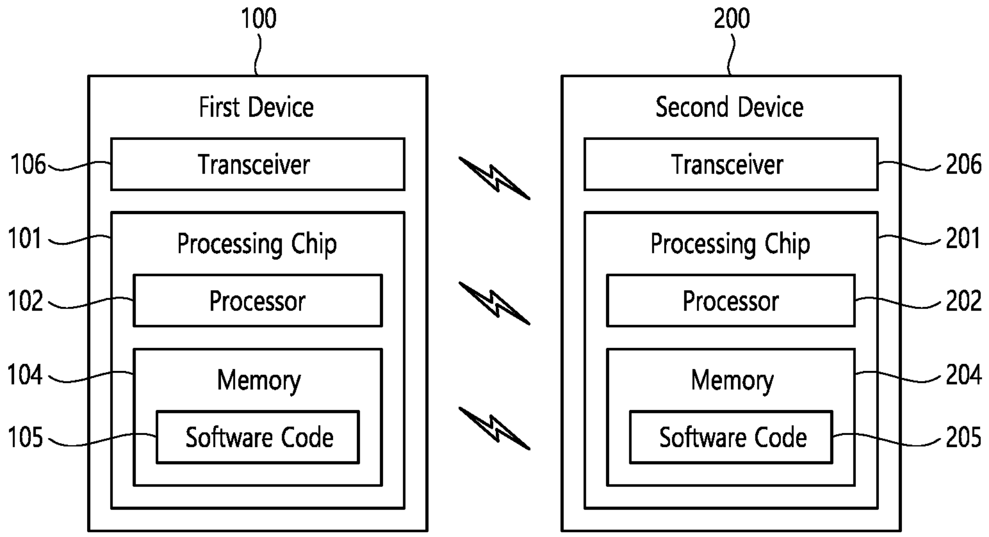
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
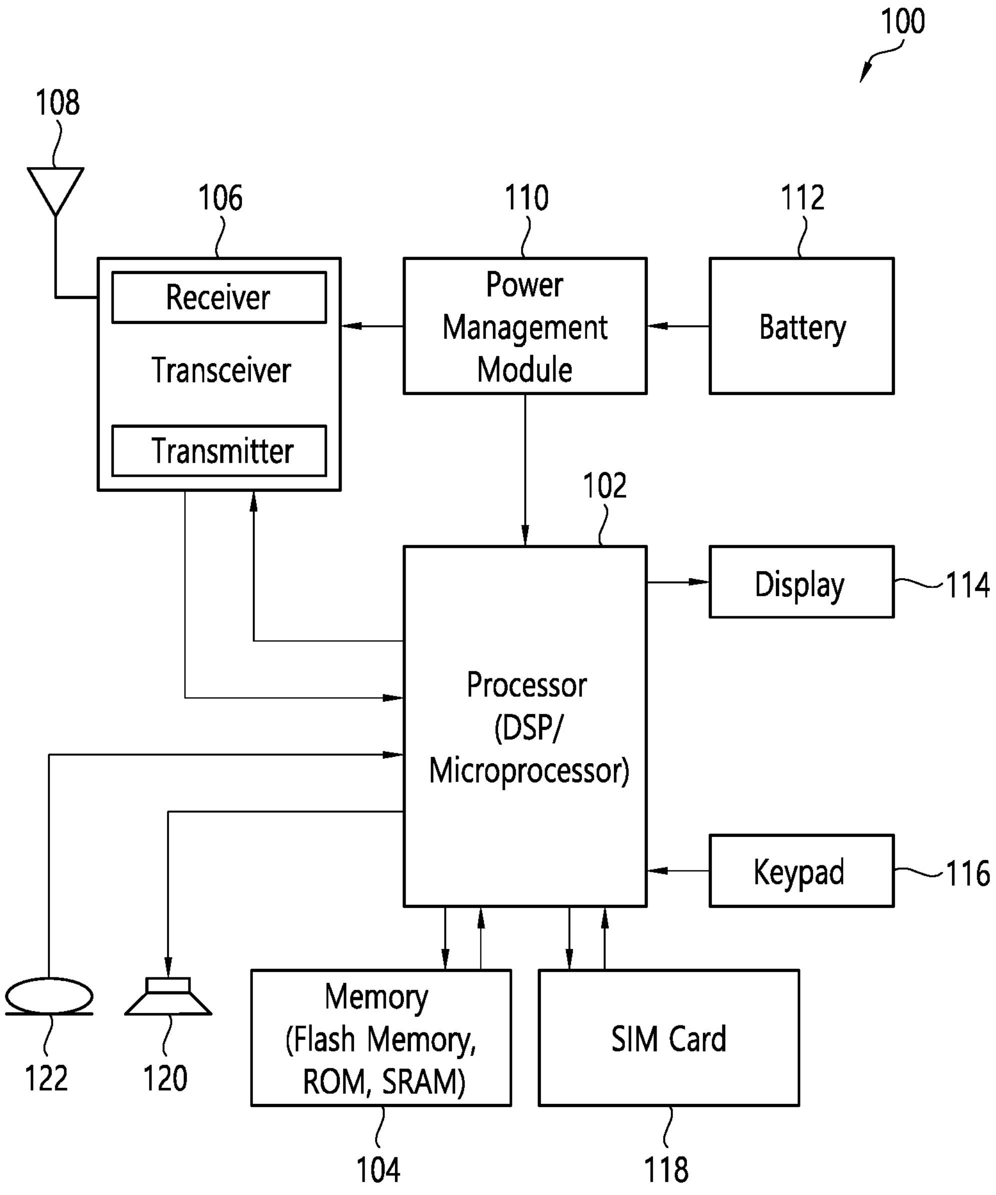
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
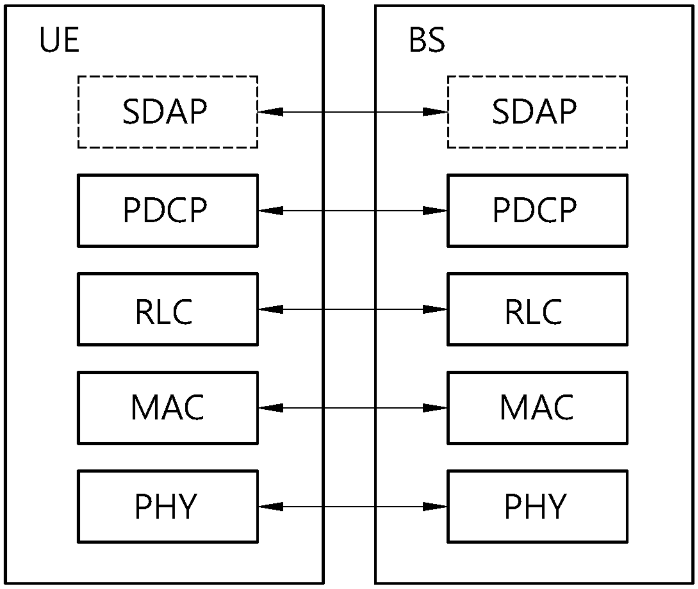
FIGS. 6 and 7 show an example of protocol stacks in a 3GPP based wireless communication system to which implementations of the present disclosure is applied.
Figure 7:
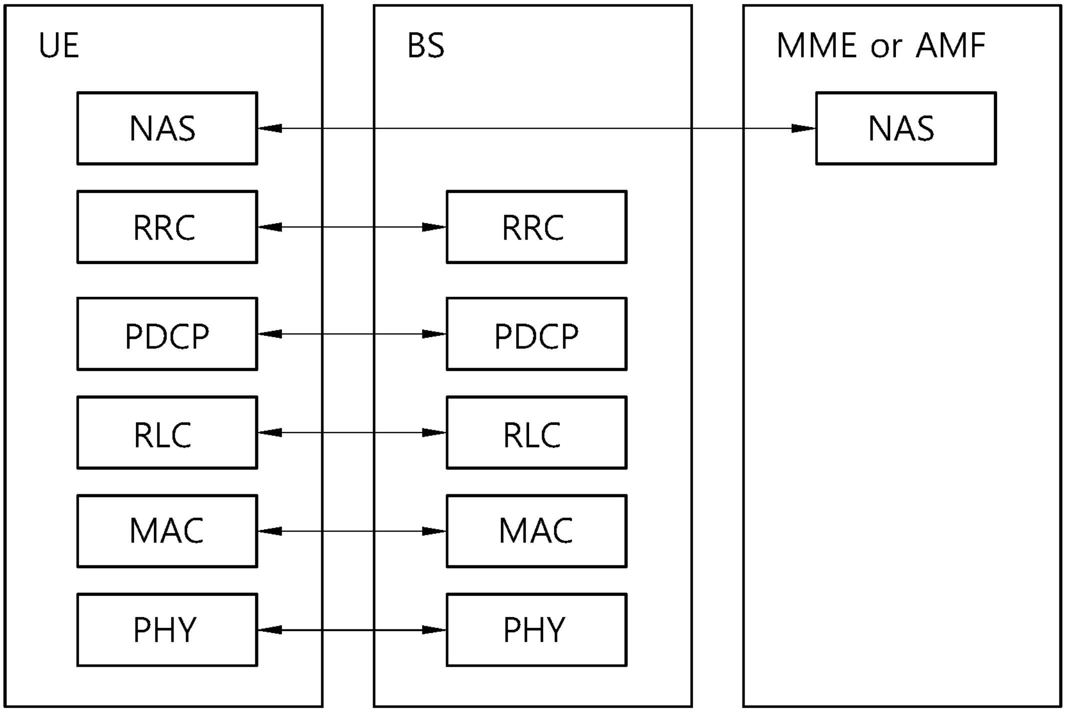

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels: multiplexing/de-multiplexing of MAC SDUs belonging to one or different logical channels into/from transport blocks (TB) delivered to/from the physical layer on transport channels: scheduling information reporting: error correction through hybrid automatic repeat request (HARQ) (one HARQ entity per cell in case of carrier aggregation (CA)); priority handling between UEs by means of dynamic scheduling: priority handling between logical channels of one UE by means of logical channel prioritization: padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH): BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH): DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs: reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering: header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering: ciphering, deciphering and integrity protection: transfer of control plane data: reordering and duplicate detection: in-order delivery: duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer. UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
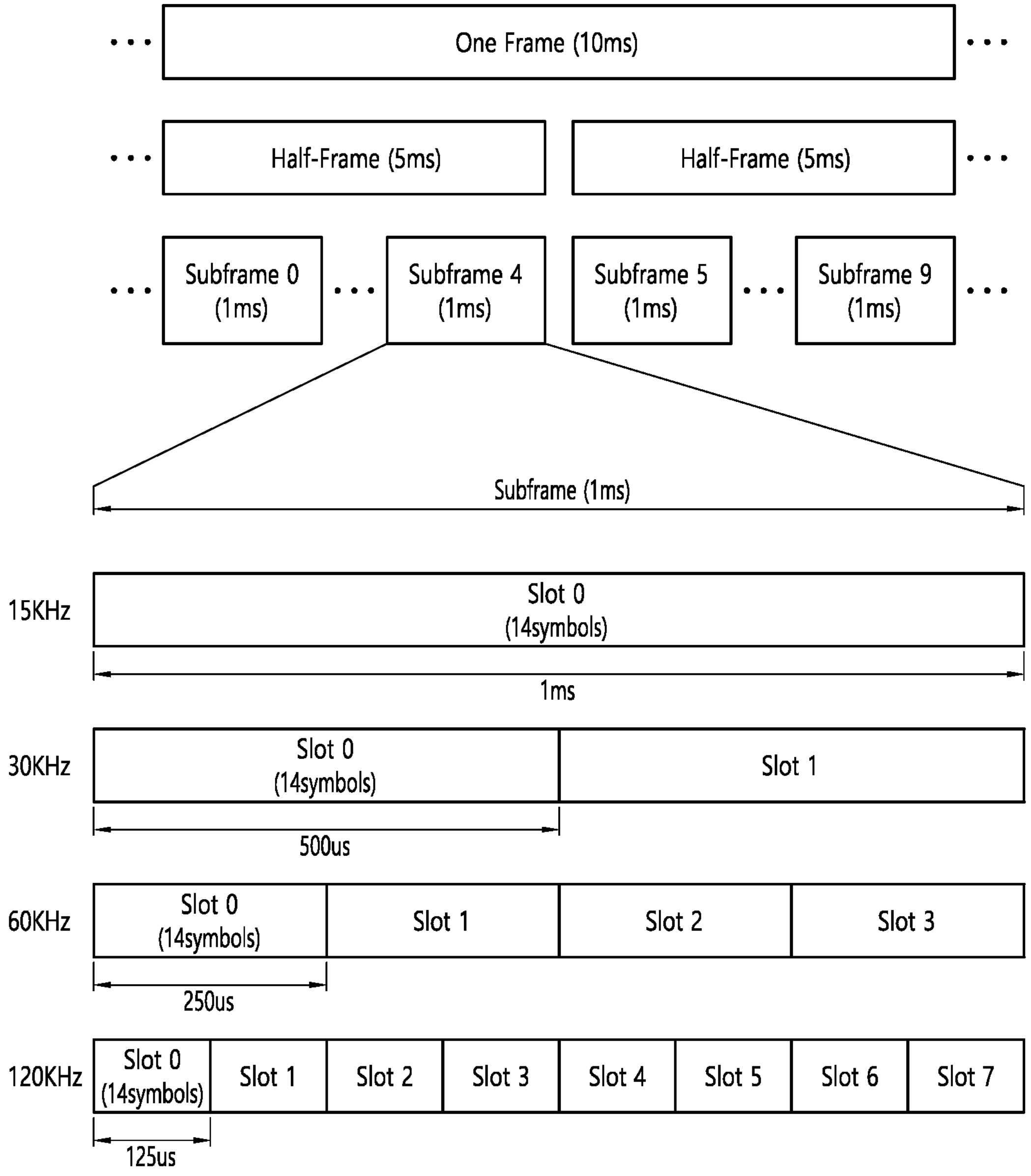
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ KHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ KHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ KHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHZ (or 5850, 5900, 5925 MHZ, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
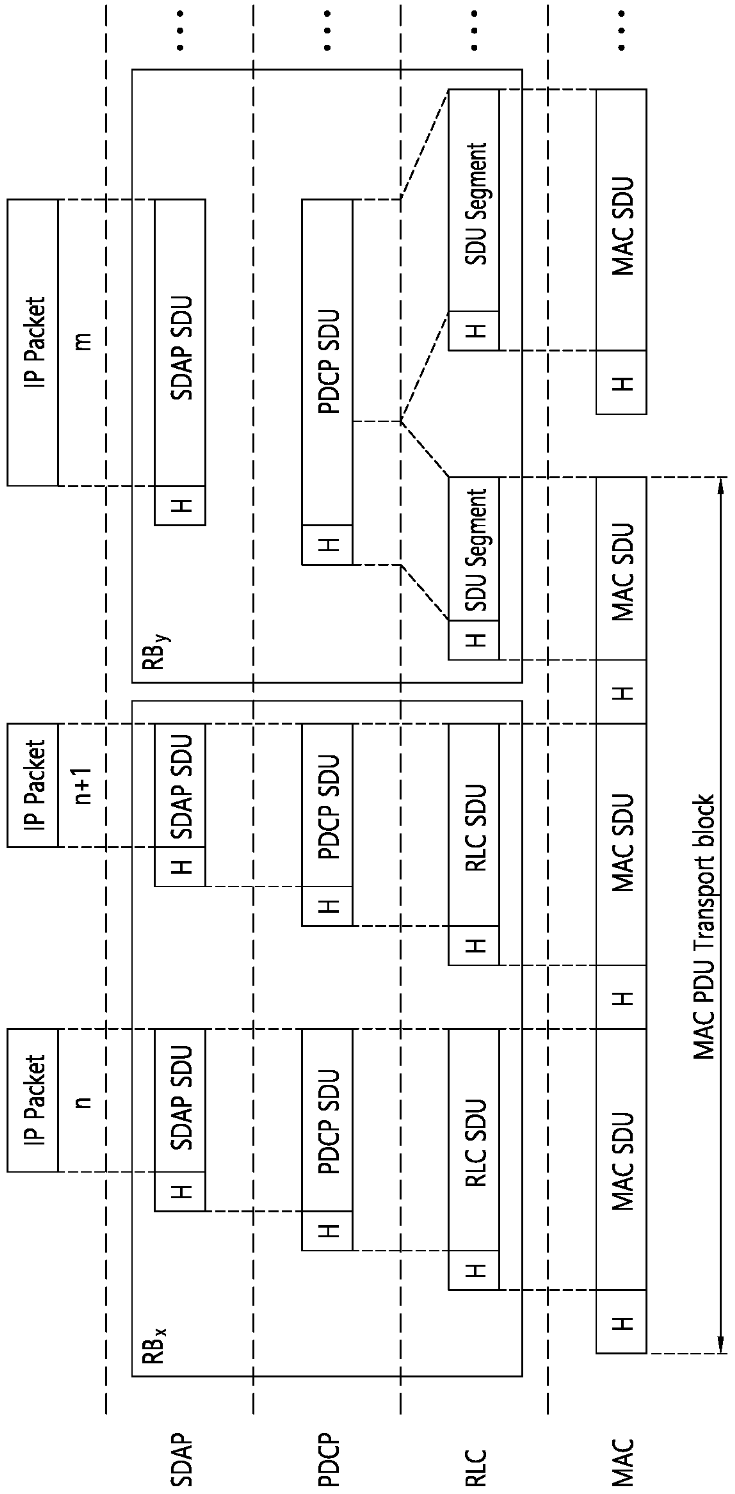
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9. "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH. BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to Radio link monitoring are described. Section 5 of 3GPP TS 38.213 v16.6.0 may be referred.

The downlink radio link quality of the primary cell is monitored by a UE for the purpose of indicating out-of-sync/in-sync status to higher layers. The UE is not required to monitor the downlink radio link quality in DL BWPs other than the active DL BWP, on the primary cell. If the active DL BWP is the initial DL BWP and for SS/PBCH block and CORESET multiplexing pattern 2 or 3, the UE is expected to perform RLM using the associated SS/PBCH block when the associated SS/PBCH block index is provided by RadioLinkMonitoringRS.

If the UE is configured with a SCG, and the parameter rlf-TimersAndConstants is provided by higher layers and is not set to release, the downlink radio link quality of the PSCell of the SCG is monitored by the UE for the purpose of indicating out-of-sync/in-sync status to higher layers. The UE is not required to monitor the downlink radio link quality in DL BWPs other than the active DL BWP on the PSCell.

A UE can be configured for each DL BWP of a SpCell with a set of resource indexes, through a corresponding set of RadioLinkMonitoringRS, for radio link monitoring by failureDetectionResources. The UE is provided either a CSI-RS resource configuration index, by csi-RS-Index, or a SS/PBCH block index, by ssb-Index. The UE can be configured with up to $N_{LR-RLM}$ RadioLinkMonitoringRS for link recovery procedures, and for radio link monitoring. From the $N_{LR-RLM}$ RadioLinkMonitoringRS, up to $N_{RLM}$ RadioLinkMonitoringRS can be used for radio link monitoring depending on $L_{max}$ as described in Table 5, and up to two RadioLinkMonitoringRS can be used for link recovery procedures.

For operation with shared spectrum channel access, when a UE is provided a SS/PBCH block index by ssb-Index, the UE is expected to perform radio link monitoring using SS/PBCH block(s) in the discovery burst transmission window, where the SS/PBCH block(s) have candidate SS/PBCH block index(es) corresponding to SS/PBCH block index provided by ssb-Index.

If the UE is not provided RadioLinkMonitoringRS and the UE is provided for PDCCH receptions TCI states that include one or more of a CSI-RS the UE uses for radio link monitoring the RS provided for the active TCI state for PDCCH reception if the active TCI state for PDCCH reception includes only one RS if the active TCI state for PDCCH reception includes two RS, the UE expects that one RS is configured with qcl-Type set to 'typeD' and the UE uses the RS configured with qcl-Type set to 'typeD' for radio link monitoring: the UE does not expect both RS to be configured with qcl-Type set to 'typeD' the UE is not required to use for radio link monitoring an aperiodic or semi-persistent RS For $L_{max}$=4, the UE selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE determines the order of the CORESET from the highest CORESET index.

A UE does not expect to use more than $N_{RLM}$ RadioLinkMonitoringRS for radio link monitoring when the UE is not provided RadioLinkMonitoringRS.

Values of $N_{LR-RLM}$ and $N_{RLM}$ for different values of $L_{max}$ are given in Table 5.

In other words, table 5 shows Values of $N_{LR-RLM}$ and $N_{RLM}$ as a function of maximum number $L_{max}$ of SS/PBCH blocks per half frame

TABLE 5

| $L_{max}$ | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, powerControlOffsetSS is not applicable and a UE expects to be provided only 'noCDM' from cdm-Type, only 'one' and 'three' from density, and only '1 port' from nrofPorts.

If a UE is configured with multiple DL BWPs for a serving cell, the UE performs RLM using the RS(s) corresponding to resource indexes provided by RadioLinkMonitoringRS for the active DL BWP or, if RadioLinkMonitoringRS is not provided for the active DL BWP, using the RS(s) provided for the active TCI state for PDCCH receptions in CORESETs on the active DL BWP.

In non-DRX mode operation, the physical layer in the UE assesses once per indication period the radio link quality, evaluated over the previous time period, against thresholds ($Q_{out}$ and $Q_{in}$) configured by rlmInSyncOutOfSyncThreshold. The UE determines the indication period as the maximum between the shortest periodicity for radio link monitoring resources and 10 msec.

In DRX mode operation, the physical layer in the UE assesses once per indication period the radio link quality, evaluated over the previous time period, against thresholds ($Q_{out}$ and $Q_{in}$) provided by rlmInSyncOutOfSyncThreshold. The UE determines the indication period as the maximum between the shortest periodicity for radio link monitoring resources and the DRX period.

The physical layer in the UE indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE indicates, in frames where the radio link quality is assessed, in-sync to higher layers.

Hereinafter, technical features related to Radio Link Monitoring Configuration are described. Section 6.3.2 of 3GPP TS 38.331 v16.5.0 may be referred.

The IE RadioLinkMonitoringConfig is used to configure radio link monitoring for detection of beam- and/or cell radio link failure.

RadioLinkMonitoringConfig information element may include RadioLinkMonitoringConfig and RadioLinkMonitoringRS. The RadioLinkMonitoringRS may include purpose in the format of ENUMERATED. For example, the RadioLinkMonitoringRS may include one of {beamFailure, rlf, both}.

Table 6 shows an example of a RadioLinkMonitoringConfig information element.

TABLE 6

```
-- ASN1START
-- TAG-RADIOLINKMONITORINGCONFIG-START
RadioLinkMonitoringConfig ::=                SEQUENCE {
   failureDetectionResourcesToAddModList                    SEQUENCE
(SIZE(1..maxNrofFailureDetectionResources)) OF RadioLinkMonitoringRS
OPTIONAL, -- Need N
   failureDetectionResourcesToReleaseList                   SEQUENCE
(SIZE(1..maxNrofFailureDetectionResources)) OF RadioLinkMonitoringRS-Id
OPTIONAL, -- Need N
   beamFailureInstanceMaxCount                  ENUMERATED {n1, n2, n3, n4, n5,
n6, n8, n10}                             OPTIONAL, -- Need R
   beamFailureDetectionTimer                    ENUMERATED {pbfd1, pbfd2, pbfd3,
pbfd4, pbfd5, pbfd6, pbfd8, pbfd10}         OPTIONAL, -- Need R
   ...
}
RadioLinkMonitoringRS ::=                    SEQUENCE {
   radioLinkMonitoringRS-Id                     RadioLinkMonitoringRS-Id,
   purpose                                        ENUMERATED {beamFailure, rlf, both},
   detectionResource                            CHOICE {
      ssb-Index                                      SSB-Index,
      csi-RS-Index                                   NZP-CSI-RS-ResourceId
   },
   ...
}
-- TAG-RADIOLINKMONITORINGCONFIG-STOP
-- ASN1STOP
```

Table 7 shows an example of RadioLinkMonitoringConfig field descriptions and RadioLinkMonitoringRS field descriptions.

TABLE 7

| |
|---|
| RadioLinkMonitoringConfig field descriptions |
| beamFailureDetectionTimer |
| Timer for beam failure detection. See also the BeamFailureRecoveryConfig IE. Value in number of "$Q_{out, LR}$ reporting periods of Beam Failure Detection" Reference Signal. Value pbfd1 corresponds to 1 $Q_{out, LR}$ reporting period of Beam Failure Detection Reference Signal, value pbfd2 corresponds to 2 $Q_{out, LR}$ reporting periods of Beam Failure Detection Reference Signal and so on. |
| beamFailureInstanceMaxCount |
| This field determines after how many beam failure events the UE triggers beam failure recovery. Value n1 corresponds to 1 beam failure instance, value n2 corresponds to 2 beam failure instances and so on. |
| failureDetectionResourcesToAddModList |
| A list of reference signals for detecting beam failure and/or cell level radio link failure (RLF). The limits of the reference signals that the network can configure are specified table 5 above. The network configures at most two detectionResources per BWP for the purpose beamFailure or both. If no RSs are provided for the purpose of beam failure detection, the UE performs beam monitoring based on the activated TCI-State for PDCCH. If no RSs are provided in this list for the purpose of RLF detection, the UE performs Cell-RLM based on the activated TCI-State of PDCCH. The network ensures that the UE has a suitable set of reference signals for performing cell-RLM. |
| RadioLinkMonitoringRS field descriptions |
| detectionResource |
| A reference signal that the UE shall use for radio link monitoring or beam failure detection (depending on the indicated purpose). Only periodic 1-port CSI-RS can be configured on SCell for beam failure detection purpose. |
| purpose |
| Determines whether the UE shall monitor the associated reference signal for the purpose of cell- and/or beam failure detection. For SCell, network only configures the value to beamFailure. |

The IE RadioLinkMonitoringRS-Id is used to identify one RadioLinkMonitoringRS. For example, RadioLinkMonitoringRS-Id information element may include RadioLinkMonitoringRS-Id in the format of INTEGER. For example, the RadioLinkMonitoringRS-Id may have an integer value within (0.maxNrofFailureDetectionResources−1).

Hereinafter, technical features related to Radio link failure related actions are described. Section 5.3.10 of 3GPP TS 38.331 v16.5.0 may be referred.

1. Detection of Physical Layer Problems in RRC_CONNECTED

The UE shall:

1> if any DAPS bearer is configured, upon receiving N310 consecutive "out-of-sync" indications for the source SpCell from lower layers and T304 is running:

2> start timer T310 for the source SpCell.

1> upon receiving N310 consecutive "out-of-sync" indications for the SpCell from lower layers while neither T300, T301, T304, T311, T316 nor T319 are running:

2> start timer T310 for the corresponding SpCell.

2. Recovery of Physical Layer Problems

Upon receiving N311 consecutive "in-sync" indications for the SpCell from lower layers while T310 is running, the UE shall:

1> stop timer T310 for the corresponding SpCell.

1> stop timer T312 for the corresponding SpCell, if running.

In this case, the UE maintains the RRC connection without explicit signalling, i.e. the UE maintains the entire radio resource configuration.

Periods in time where neither "in-sync" nor "out-of-sync" is reported by L1 do not affect the evaluation of the number of consecutive "in-sync" or "out-of-sync" indications.

3. Detection of Radio Link Failure

The UE shall:

1> if any DAPS bearer is configured and T304 is running:

2> upon T310 expiry in source SpCell: or

2> upon random access problem indication from source MCG MAC: or

2> upon indication from source MCG RLC that the maximum number of retransmissions has been reached: or 2> upon consistent uplink LBT failure indication from source MCG MAC:

3> consider radio link failure to be detected for the source MCG i.e. source RLF:

3> suspend the transmission and reception of all DRBs in the source MCG:

3> reset MAC for the source MCG:

3> release the source connection.

1> else:

2> during a DAPS handover: the following only applies for the target PCell:

2> upon T310 expiry in PCell: or

2> upon T312 expiry in PCell: or 2 upon random access problem indication from MCG MAC while neither T300, T301, T304, T311 nor T319 are running: or 2> upon indication from MCG RLC that the maximum number of retransmissions has been reached: or 2> if connected as an IAB-node, upon BH RLF indication received on BAP entity from the MCG: or 2> upon consistent uplink LBT failure indication from MCG MAC while T304 is not running:

3> if the indication is from MCG RLC and CA duplication is configured and activated for MCG, and for the corresponding logical channel allowedServingCells only includes SCell(s):

4> initiate the failure information procedure to report RLC failure.

3> else:

4> consider radio link failure to be detected for the MCG, i.e. MCG RLF:

4> discard any segments of segmented RRC messages stored:

4> if AS security has not been activated:

5> perform the actions upon going to RRC_IDLE, with release cause 'other':—

4> else if AS security has been activated but SRB2 and at least one DRB or, for IAB, SRB2, have not been setup:

5> store the radio link failure information in the VarRLF-Report:

5> perform the actions upon going to RRC_IDLE, with release cause 'RRC connection failure':

4> else:

5> store the radio link failure information in the VarRLF-Report:

5> if T316 is configured; and

5> if SCG transmission is not suspended; and

5> if neither PSCell change nor PSCell addition is ongoing (i.e. timer T304 for the NR PSCell is not running in case of NR-DC or timer T307 of the E-UTRA PSCell is not running, in NE-DC):

6> initiate the MCG failure information procedure to report MCG radio link failure.

5> else:

6> initiate the connection re-establishment procedure.

The UE shall:

1> upon T310 expiry in PSCell; or

1> upon T312 expiry in PSCell: or

1> upon random access problem indication from SCG MAC: or

1> upon indication from SCG RLC that the maximum number of retransmissions has been reached: or 1> if connected as an IAB-node, upon BH RLF indication received on BAP entity from the SCG: or 1> upon consistent uplink LBT failure indication from SCG MAC:

2> if the indication is from SCG RLC and CA duplication is configured and activated for SCG, and for the corresponding logical channel allowedServingCells only includes SCell(s):

3> initiate the failure information procedure to report RLC failure.

2> else:

3> consider radio link failure to be detected for the SCG, i.e. SCG RLF;

3> if MCG transmission is not suspended:

4> initiate the SCG failure information procedure to report SCG radio link failure.

3> else:

4> if the UE is in NR-DC:

5> initiate the connection re-establishment procedure:

4> else (the UE is in (NG) EN-DC):

5> initiate the connection re-establishment procedure:

4. RLF Cause Determination

The UE shall set the rlf-Cause in the VarRLF-Report as follows:

1> if the UE declares radio link failure due to T310 expiry:

2> set the rlf-Cause as t310-Expiry:

1> else if the UE declares radio link failure due to the random access problem indication from MCG MAC:

2> if the random access procedure was initiated for beam failure recovery;

3> set the rlf-Cause as beamFailureRecoveryFailure:

2> else:

3> set the rlf-Cause as randomAccessProblem:

1> else if the UE declares radio link failure due to the reaching of maximum number of retransmissions from the MCG RLC:

2> set the rlf-Cause as rlc-MaxNumRetx:

1> else if the UE declares radio link failure due to consistent uplink LBT failures:

2> set the rlf-Cause as lbtFailure;

1> else if the IAB-MT declares radio link failure due to the reception of a BH RLF indication on BAP entity:

2> set the rlf-Cause as bh-rlfRecoveryFailure.

Hereinafter, technical features related to (i) Radio Link Failure and (ii) Beam failure detection and recovery are described. Sections 9.2.7 and 9.2.8 of 3GPP TS 38.300 v16.5.0 may be referred.

Radio Link Failure

In RRC_CONNECTED, the UE performs Radio Link Monitoring (RLM) in the active BWP based on reference signals (SSB/CSI-RS) and signal quality thresholds configured by the network. SSB-based RLM is based on the SSB associated to the initial DL BWP and can only be configured for the initial DL BWP and for DL BWPs containing the SSB associated to the initial DL BWP. For other DL BWPs, RLM can only be performed based on CSI-RS. In case of DAPS handover, the UE continues the RLM at the source cell until the successful completion of the random access procedure to the target cell.

The UE declares Radio Link Failure (RLF) when one of the following criteria are met:

Expiry of a radio problem timer started after indication of radio problems from the physical layer (if radio problems are recovered before the timer is expired, the UE stops the timer): or Expiry of a timer started upon triggering a measurement report for a measurement identity for which the timer has been configured while another radio problem timer is running: or Random access procedure failure; or RLC failure: or Detection of consistent uplink LBT failures for operation with shared spectrum channel access: or For IAB-MT, the reception of BH RLF indication received from its parent node.

After RLF is declared, the UE:

stays in RRC_CONNECTED:

in case of DAPS handover, for RLF in the source cell:

stops any data transmission or reception via the source link and releases the source link, but maintains the source RRC configuration:

if handover failure is then declared at the target cell, the UE:

selects a suitable cell and then initiates RRC re-establishment;

enters RRC_IDLE if a suitable cell was not found within a certain time after handover failure was declared.

in case of CHO, for RLF in the source cell:

selects a suitable cell and if the selected cell is a CHO candidate and if network configured the UE to try CHO after RLF then the UE attempts CHO execution once, otherwise re-establishment is performed:

enters RRC_IDLE if a suitable cell was not found within a certain time after RLF was declared.

otherwise, for RLF in the serving cell or in case of DAPS handover, for RLF in the target cell before releasing the source cell:

selects a suitable cell and then initiates RRC re-establishment:

enters RRC_IDLE if a suitable cell was not found within a certain time after RLF was declared.

When RLF occurs at the IAB BH link, the same mechanisms and procedures are applied as for the access link. This includes BH RLF detection and RLF recovery.

In case the RRC reestablishment procedure fails, the IAB-node may transmit a BH RLF indication to its child nodes. The BH RLF indication is transmitted as BAP Control PDU.

Beam Failure Detection and Recovery

For beam failure detection, the gNB configures the UE with beam failure detection reference signals (SSB or CSI-RS) and the UE declares beam failure when the number of beam failure instance indications from the physical layer reaches a configured threshold before a configured timer expires.

SSB-based Beam Failure Detection is based on the SSB associated to the initial DL BWP and can only be configured for the initial DL BWPs and for DL BWPs containing the SSB associated to the initial DL BWP. For other DL BWPs, Beam Failure Detection can only be performed based on CSI-RS.

After beam failure is detected on PCell, the UE:

triggers beam failure recovery by initiating a Random Access procedure on the PCell:

selects a suitable beam to perform beam failure recovery (if the gNB has provided dedicated Random Access resources for certain beams, those will be prioritized by the UE).

includes an indication of a beam failure on PCell in a BFR MAC CE if the Random Access procedure involves contention-based random access.

Upon completion of the Random Access procedure, beam failure recovery for PCell is considered complete.

After beam failure is detected on an SCell, the UE:

triggers beam failure recovery by initiating a transmission of a BFR MAC CE for this SCell:

selects a suitable beam for this SCell (if available) and indicates it along with the information about the beam failure in the BFR MAC CE.

Upon reception of a PDCCH indicating an uplink grant for a new transmission for the HARQ process used for the transmission of the BFR MAC CE, beam failure recovery for this SCell is considered complete.

Hereinafter, technical features related Beam Failure Detection and Recovery procedure are described. Section 5.17 of 3GPP TS 38.321 v16.5.0 may be referred.

The MAC entity may be configured by RRC with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:

beamFailureInstanceMaxCount for the beam failure detection:

beamFailureDetectionTimer for the beam failure detection:

beamFailureRecoveryTimer for the beam failure recovery procedure:

rsrp-ThresholdSSB: an RSRP threshold for the beam failure recovery;

power RampingStep: power RampingStep for the beam failure recovery;

power RampingStepHighPriority: power RampingStepHighPriority for the beam failure recovery;

preambleReceivedTargetPower: preambleReceivedTargetPower for the beam failure recovery;

preambleTransMax: preambleTransMax for the beam failure recovery;

scalingFactorBI: scalingFactorBI for the beam failure recovery;

ssb-perRACH-Occasion: ssb-perRACH-Occasion for the beam failure recovery;

ra-ResponseWindow: the time window to monitor response(s) for the beam failure recovery using contention-free Random Access Preamble;

prach-ConfigurationIndex: prach-ConfigurationIndex for the beam failure recovery;

ra-ssb-OccasionMaskIndex: ra-ssb-OccasionMaskIndex for the beam failure recovery;

ra-OccasionList: ra-OccasionList for the beam failure recovery.

The following UE variables are used for the beam failure detection procedure:

BFI_COUNTER: counter for beam failure instance indication which is initially set to 0.

The MAC entity shall:

1> if beam failure instance indication has been received from lower layers:

2> start or restart the beamFailureDetectionTimer:

2> increment BFI_COUNTER by 1:

2> if BFI_COUNTER>=beamFailureInstanceMaxCount:

3> initiate a Random Access procedure on the SpCell.

1> if the beamFailureDetectionTimer expires: or

1> if beamFailureDetectionTimer, beamFailureInstanceMaxCount, or any of the reference signals used for beam failure detection is reconfigured by upper layers:

2> set BFI_COUNTER to 0.

1> if the Random Access procedure is successfully completed:

2> set BFI_COUNTER to 0;

2> stop the beamFailureRecoveryTimer, if configured:

2> consider the Beam Failure Recovery procedure successfully completed.

Meanwhile, in NR, the UE may perform radio link monitoring (RLM) using radio resource(s) (for example, reference signal(s)) corresponding to resource indexes, which is provided by radio link monitoring reference signal (s) for the active DL BWP.

For a UE configured with Master Cell Group (MCG) and Secondary Cell Group (SCG), Radio link monitoring reference signal(s) could be configured in each CG configuration, and the UE may perform RLM using the reference signal(s) based on purpose of each reference signal in the configuration. The purpose of radio monitoring may be one of radio link failure, beam failure, or both.

In addition, in NR, the UE could deactivate SCG for power saving. While the SCG is deactivated, the UE may keep radio link monitoring to check if the SCG is usable. If the SCG failure is detected, the UE may need to report the failure to network via MCG or to perform recovery procedure.

Since the radio link monitoring requires a consistent UE power consumption, more power-efficient radio link monitoring is beneficial for deactivated SCG. Since link or beam failure report may require extra UE power consumption for uplink transmission, selective reference signal(s) for deactivated SCG may be beneficial for power saving.

Therefore, studies for link monitoring in a wireless communication system are required.

Hereinafter, a method for link monitoring in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
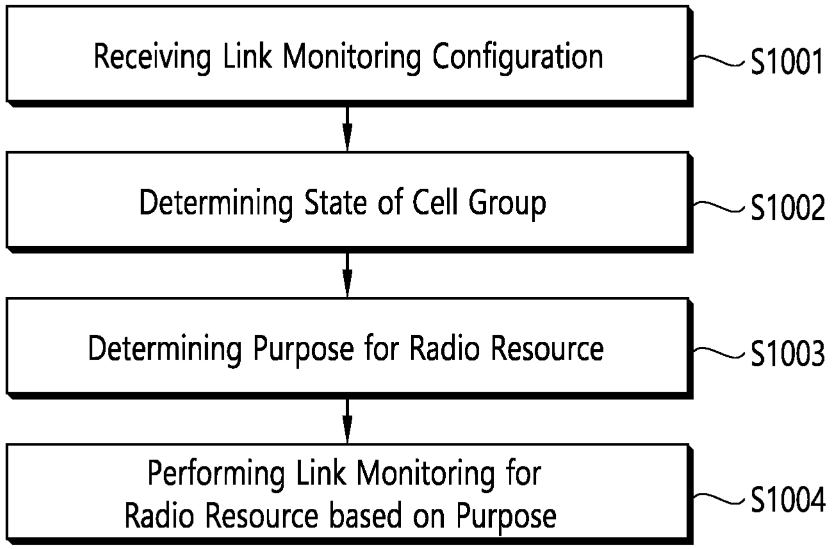
FIG. 10 shows an example of a method for link monitoring in a wireless communication system, according to some embodiments of the present disclosure.

FIG. 10 shows an example of a method for link monitoring in a wireless communication system, according to some embodiments of the present disclosure.

In particular, FIG. 10 shows an example of a method performed by a wireless device.

In step S1001, a wireless device may receive a link monitoring configuration for measurements of a cell group.

For example, the link monitoring configuration may include (i) a first index of a first radio resource, (ii) a first purpose related to the first radio resource for an activated state, and (iii) a second purpose related to the first radio resource for a deactivated state.

For example, the first radio resource may include a reference signal or a synchronization signal block (SSB).

For example, the first purpose may include at least one of (i) RLF detection, (ii) BF detection, and (iii) both the RLF detection and the BF detection.

For example, the second purpose may include one of (i) Radio Link Failure (RLF) detection, (ii) Beam Failure (BF) detection, (iii) both the RLF detection and the BF detection, and (iv) neither the RLF detection nor BF detection.

For example, the link monitoring configuration may include (i) a second index of a second radio resource, (ii) a first purpose related to the second radio resource for an activated state, and (iii) a second purpose related to the second radio resource for a deactivated state.

For example, the second purpose related to the first radio resource is different from the second purpose related to the second radio resource.

In other words, the link monitoring configuration may include information on multiple radio resources.

For example, the cell group may be a secondary cell group (SCG) in dual connectivity. For other example, the cell group may be a master cell group (MCG) in the dual connectivity.

For example, before receiving the link monitoring configuration for measurements of a cell group, the wireless device may establish an RRC Connection on a primary cell (PCell) for the cell group. In this case, the wireless device could receive the link monitoring configuration from the PCell of the cell group.

In step S1002, a wireless device may determine a state of the cell group among the activated state and the deactivated state.

For example, the wireless device may receive a radio resource control (RRC) reconfiguration including a deactivation command for the cell group. In this case, upon receiving the deactivation command, the wireless device may deactivate the cell group.

Then, the wireless may determine the state of the cell group as the deactivated state.

For other example, the wireless device may receive a radio resource control (RRC) reconfiguration including an activation command for the cell group. In this case, upon receiving the activation command, the wireless device may activate the cell group.

Then, the wireless may determine the state of the cell group as the activated state.

In step S1003, a wireless device may determine a specific purpose for the first radio resource among the first purpose and the second purpose based on the state of the cell group.

For example, the wireless device may determine the specific purpose for the first radio resource as the first purpose, when the cell group is in the activated state.

For other example, the wireless device may determine the specific purpose for the first radio resource as the second purpose, when the cell group is in the deactivated state.

For example, a wireless device may receive a radio resource control (RRC) reconfiguration including a deactivation command for the cell group. In this case, the cell group may become a deactivated state upon receiving the RRC reconfiguration. In other words, the wireless device may consider the cell group as in the deactivated state, upon receiving the RRC reconfiguration.

In step S1004, a wireless device may perform link monitoring for the first radio resource based on the specific purpose.

For example, when the specific purpose is determined as the first purpose, the wireless device may perform the link monitoring for the first radio resource based on the first purpose. When the first purpose is an RLF detection, the wireless device may perform the radio link monitoring for the first radio resource. When the first purpose is a BF detection, the wireless device may perform the beam monitoring for the first radio resource. When the first purpose is "both" (that is, both the RLF detection and the BF detection), the wireless device may perform both the radio link monitoring and the beam monitoring for the first radio resource. When the first purpose is "neither" (that is, neither the RLF detection nor the BF detection), the wireless device may perform neither the radio link monitoring nor the beam monitoring for the first radio resource. In other words, when the first purpose is "neither" (that is, neither the RLF detection nor the BF detection), the wireless device may not perform the link monitoring for the first radio resource.

For example, when the specific purpose is determined as the second purpose, the wireless device may perform the link monitoring for the first radio resource based on the second purpose. When the second purpose is an RLF detection, the wireless device may perform the radio link monitoring for the first radio resource. When the second purpose is a BF detection, the wireless device may perform the beam monitoring for the first radio resource. When the second purpose is "both" (that is, both the RLF detection and the BF detection), the wireless device may perform both the radio link monitoring and the beam monitoring for the first radio resource. When the second purpose is "neither" (that is, neither the RLF detection nor the BF detection), the wireless device may perform neither the radio link monitoring nor the beam monitoring for the first radio resource. In other words, when the second purpose is "neither" (that is, neither the RLF detection nor the BF detection), the wireless device may not perform the link monitoring for the first radio resource.

According to some embodiments of the present disclosure, the wireless device may activate the cell group. The wireless device may perform data transmission via the cell group. When the cell group is in the activated state, the wireless device may perform link monitoring for the first radio resource based on the first purpose.

In this example, the wireless device may receive an RRC reconfiguration including a deactivation command for the cell group. The wireless device may deactivate the cell group upon receiving the RRC reconfiguration. The wireless device may not perform data transmission via the cell group. When the cell group is in the deactivated state, the wireless device may perform link monitoring for the first radio resource based on the second purpose.

In particular, when the second purpose is 'neither' (that is, neither the radio link failure (RLF) detection nor the beam failure (BF) detection), the wireless device may not perform the link monitoring for the first radio resource. In other words, the wireless device may skip the link monitoring for the first radio resource based on the second purpose being "neither". Since the number of the radio resource for link monitoring is reduced, the wireless device could save power for the radio link monitoring.

According to some embodiments of the present disclosure, in step S1002, the wireless device may determine whether a cell is in a dormant state or not, instead of determining the state of the cell group.

For example, the cell may be an Scell in an SCG or a Pcell in a MCG.

For example, the wireless device may receive an RRC reconfiguration including a dormant command for the cell. In this case, upon receiving the dormant command, the wireless device may consider the cell is in a dormant state.

In this case, in step S1003, a wireless device may determine a specific purpose for the first radio resource among the first purpose and the second purpose based on the state of the cell.

For example, the wireless device may determine the specific purpose for the first radio resource as the first purpose, when the cell is not in the dormant state.

For other example, the wireless device may determine the specific purpose for the first radio resource as the second purpose, when the cell is in the dormant state.

That is, in step S1004, a wireless device may perform link monitoring for the first radio resource based on the second purpose, when the cell is in the dormant state.

According to some embodiments of the present disclosure, the wireless device may be in communication with at least one of a user equipment, a network, or an autonomous vehicle other than the wireless device.

Hereinafter, various embodiments for selective link monitoring are described.

For example, the present disclosure proposes a method of selecting a radio resource set for radio link monitoring and/or beam measurement according to conditions.

For example, the UE may be configured with a Link Monitoring (LM) configuration. The LM configuration may have one or more set of resource set(s) used to detect radio link failure or beam failure, the set of resource set(s) may be used for radio link monitoring or beam measurement. The resource set(s) may be configured with SSB(s) ID or CS-RS(s) ID.

For example, the UE may be configured with MCG and possibly SCG. Each CG of the UE may be activated. Each CG of the UE may be deactivated.

For example, the UE may be configured with Scell. Each Scell may be activated. Each Scell may be deactivated. Each Scell may be dormant.

According to some embodiments of the present disclosure:

- the UE may receive a DCI for selecting the purpose of radio resource set of a serving cell, and/or
- the UE may receive a MAC CE for selecting the purpose of radio resource set of a serving cell, and/or
- the UE may receive a RRC message for selecting the purpose of radio resource set of a serving cell.

For example, while the CG may be deactivated or dormant, and TA may be expired in deactivated or dormant state.

For example, while the CG may be deactivated or dormant, and radio link failure and/or beam failure may be occurred in deactivated or dormant state.

For each reference signal or reference signal set, two purpose sets for radio monitoring may be configured. The UE may perform radio link monitoring and/or beam measure of the cell/CG, based on the cell/CG state such as activation, deactivation or dormant.

- The first purpose set may be used while the cell/cell group is in the activated state.
- The second purpose set may be used while the cell/cell group is in the deactivated state or dormant state.

For each reference signal or reference signal set, two purpose sets for radio monitoring may be configured. The UE may perform radio link monitoring and/or beam measure of the cell/CG based on the receiving signal or message.

- The first purpose set may be used if the network indicates the first purpose via PDCCH, MAC CE or RRC message.
- The second purpose set may be used if the network indicates the second purpose via PDCCH, MAC CE or RRC message.

For each RS or RS set, a purpose set may indicate one of radio link failure, beam failure, both, or neither.

- The "neither" may mean that the UE may not perform radio link monitoring and beam measurement corresponding to the RS.
- The "both" may mean that the UE may perform radio link monitoring and beam measurement using the RS to detect radio link failure and beam failure respectively.
- The "radio link failure" may mean that the UE may perform radio link monitoring using the RS to detect radio link failure.
- The "beam failure" may mean that the UE may perform beam measurement using the RS to detect beam failure.

According to the present disclosure, in the efficiency signaling point of view, reference signal or reference signal set may be configured with multiple purpose, and the purpose may be selected by one or more conditions. The condition(s) may be the followings:

- the state of cell group, e.g. dormant, deactivated or activated
- explicit indication from the network via PDCCH, MAC CE, and/or RRC message.

For example, the UE may perform radio link monitoring and/or beam measurement according to the purpose.

According to some embodiments of the present disclosure, in a method for measurements, a UE may receive a configuration for measurements of a cell group. The configuration may comprise at least one radio resource and a first indication and a second indication associated with the radio resource.

For example, the indication may indicate a purpose of the radio resources. The purpose may include "radio link failure", "beam failure", "both", or "neither".

The UE may determine applicable radio resources based on the state of the cell group and the indications.

For example, a radio resource may be considered to be applicable if the cell group is in a first state and the first indication is associated with the radio resource.

For example, a radio resource may be considered to be applicable if the cell group is in a second state and the second indication is associated with the radio resource.

The UE may perform measurements of the applicable radio resources according to the indication.

For example, the applicable radio resource may be used for measurements related to radio link failure, if the indication indicates radio link failure or both.

For example, the applicable radio resource may be used for measurements related to beam failure, if the indication indicates beam failure or both.

For example, the applicable radio resource may be excluded for measurements related to both beam failure and radio link failure, if the indication indicates neither.

Hereinafter, examples of the UE operation according to the present disclosure are described.

Figure 11:
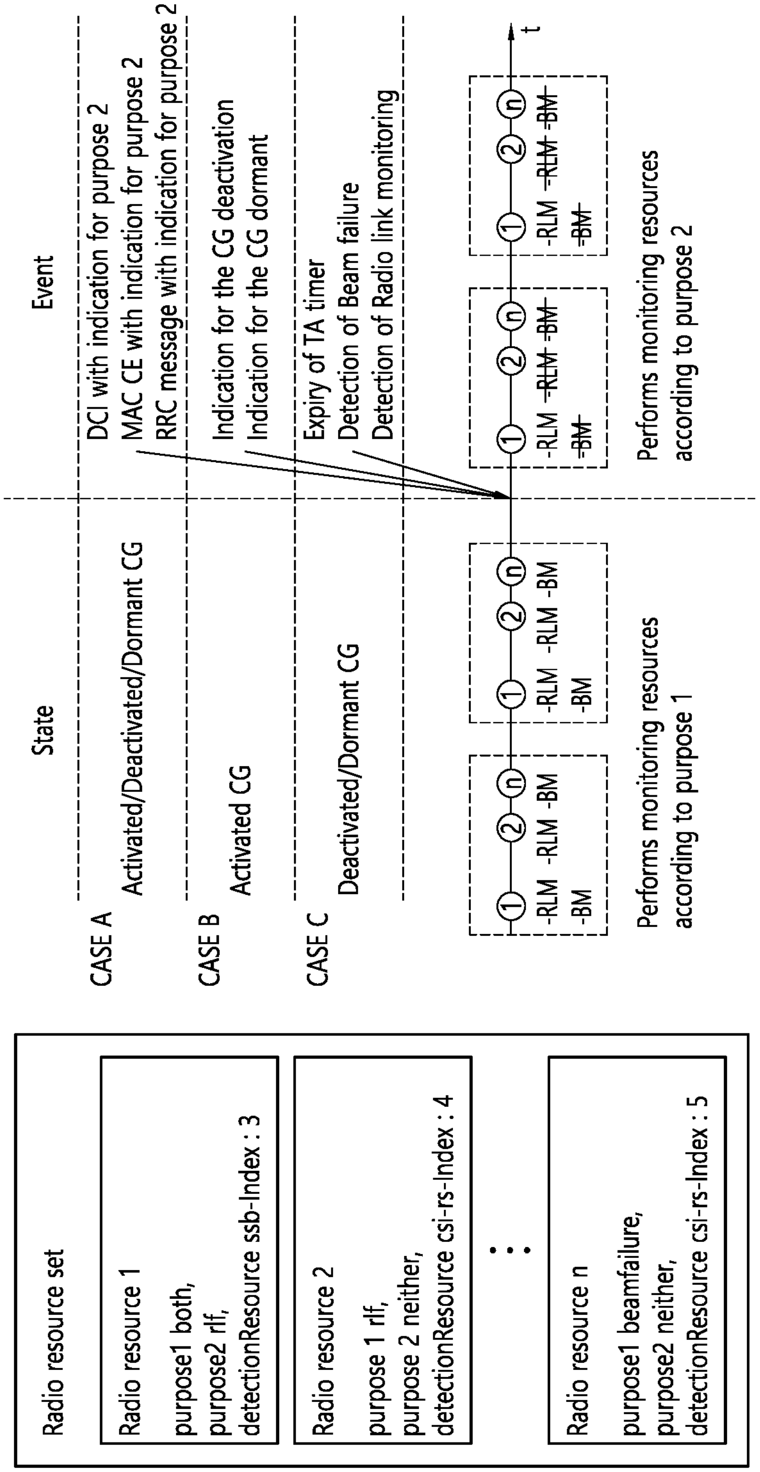
FIG. 11 shows an example of UE operations for link monitoring in a wireless communication system, according to some embodiments of the present disclosure.

FIG. 11 shows an example of UE operations for link monitoring in a wireless communication system, according to some embodiments of the present disclosure.

In FIG. 11, a radio resource set may include multiple radio resources. For example, the radio resource set may include radio resource 1, radio resource 2, . . . , and radio resource n.

The configuration for the radio resource set may include information on each radio resource. For example, the configuration for the radio resource set may include information regarding (i) a first purpose (that is, purpose 1) for each radio resource, (ii) a second purpose (that is, purpose 2) for each radio resource, (iii) a type and/or an identity of each radio resource (for example, an index of each radio resource).

For example, the configuration for the radio resource set may include information related to the radio resource 1. The configuration may include information informing that (i) a first purpose (that is, purpose 1) for the radio resource 1 is "both", (ii) a second purpose (that is, purpose 2) for the radio resource 1 is "rlf", (iii) a type and/or an identity of the radio resource 1 (that is, detection resource) (for example, an index of the radio resource 1) is "ssb-Index: 3".

For example, the configuration for the radio resource set may include information related to the radio resource 2. The configuration may include information informing that (i) a first purpose (that is, purpose 1) for the radio resource 2 is "rlf", (ii) a second purpose (that is, purpose 2) for the radio resource 2 is "neither", (iii) a type and/or an identity of the radio resource 2 (that is, detection resource) (for example, an index of the radio resource 2) is "csi-rs-Index: 4".

For example, the configuration for the radio resource set may include information related to the radio resource n. The configuration may include information informing that (i) a first purpose (that is, purpose 1) for the radio resource n is "beamfailure", (ii) a second purpose (that is, purpose 2) for the radio resource n is "neither", (iii) a type and/or an identity of the radio resource n (that is, detection resource) (for example, an index of the radio resource n) is “csi-rs-Index: 5”.

In CASE A, for a UE, a cell group (CG) may be in an activated state, a deactivated state, or a dormant state.

In this case, before the event occurs, the UE may perform monitoring resources (that is, resource 1, resource 2, . . . , and resource n) according to purpose 1. For example, the UE may perform (i) monitoring resource 1 for both the RLF detection and the BF detection, (ii) monitoring resource 2 for the RLF detection, and (iii) monitoring resource n for neither the RLF detection nor the BF detection. In other words, UE may not perform monitoring resource n.

After the event occurs, the UE may perform monitoring resources (that is, resource 1, resource 2, . . . , and resource n) according to purpose 2. For example, the UE may perform (i) monitoring resource 1 for the RLF detection, (ii) monitoring resource 2 for neither the RLF detection nor the BF detection, and (iii) monitoring resource n for neither the RLF detection and the BF detection. In other words, UE may not perform monitoring resource 2 and resource n.

In addition, in CASE A, the event may include (i) receiving a downlink control indicator (DCI) with indication for purpose 2, (ii) receiving a media access control (MAC) control element (CE) with indication for purpose 2, and/or (iii) receiving an RRC message with indication for purpose 2.

In CASE B, for a UE, a cell group (CG) may be in an activated state.

In this case, before the event occurs, the UE may perform monitoring resources (that is, resource 1, resource 2, . . . , and resource n) according to purpose 1. After the event occurs, the UE may perform monitoring resources (that is, resource 1, resource 2, . . . , and resource n) according to purpose 2.

In addition, in CASE B, the event may include (i) receiving indication for the CG deactivation, and/or (ii) receiving indication for the CG dormant.

In CASE C, for a UE, a cell group (CG) may be in a deactivated state or a dormant state.

In this case, before the event occurs, the UE may perform monitoring resources (that is, resource 1, resource 2, . . . , and resource n) according to purpose 1. After the event occurs, the UE may perform monitoring resources (that is, resource 1, resource 2, . . . , and resource n) according to purpose 2.

In addition, in CASE C, the event may include (i) expiry of TA timer, (ii) detection of beam failure, and/or (iii) detection of radio link monitoring (for example, detection of radio link failure).

Figure 12:
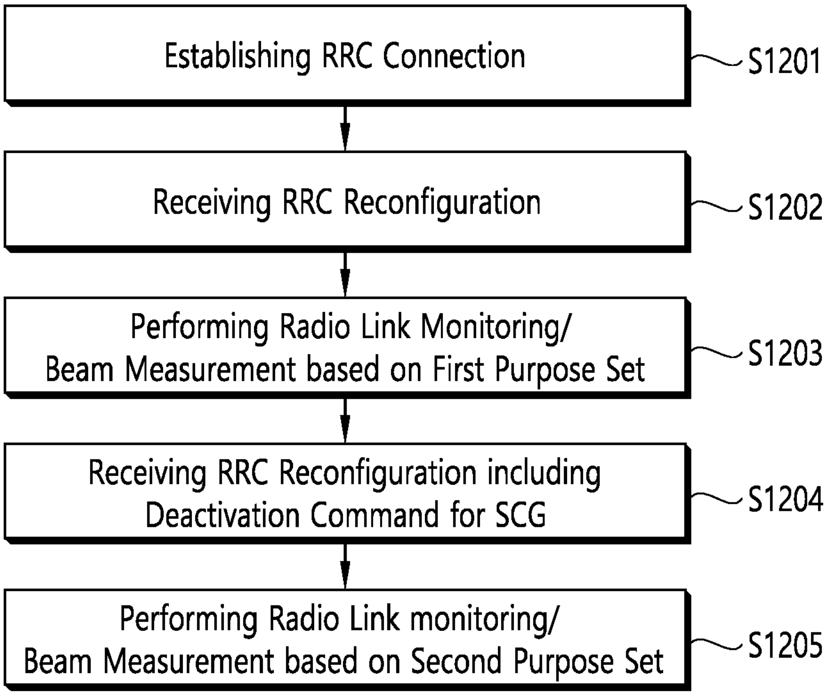
FIG. 12 shows an example for link monitoring in a dual connectivity case, according to some embodiments of the present disclosure.

FIG. 12 shows an example for link monitoring in a dual connectivity case, according to some embodiments of the present disclosure.

In step S1201, the UE may establish RRC Connection on PCell.

In step S1202, the UE may receive RRC Reconfiguration including the configuration of dual connectivity.

For example, the UE may receive RRC message for dual connectivity configuration. After applying the dual connectivity configuration, the UE activates SCG and sends data transmission not only via MCG but also via SCG. A radio link monitoring RS(s) for radio link monitoring and/or beam measurement may be configured by this RRC Reconfiguration.

In step S1203, the UE may perform radio link monitoring and/or beam measurement using each RS based on the first purpose set. The purpose set may include whether to detect radio link failure only, beam failure only, both, neither. If the RS is SSB2 and first purpose is both, the UE may perform radio link monitoring and beam measure using SSB2.

In step S1204, the UE may receive RRC Reconfiguration including deactivation command for SCG.

In step S1205, the UE may perform radio link monitoring and/or beam measurement using each RS based on the second purpose set. The second purpose set may be used while the SCG is in the deactivated state. The second purpose set may include whether to detect radio link failure only, beam failure only, both, or neither. If the RS is CSI-RS 2 and the purpose is neither, the UE may not perform radio link monitoring and beam measurement using CSI-RS 2.

Figure 13:
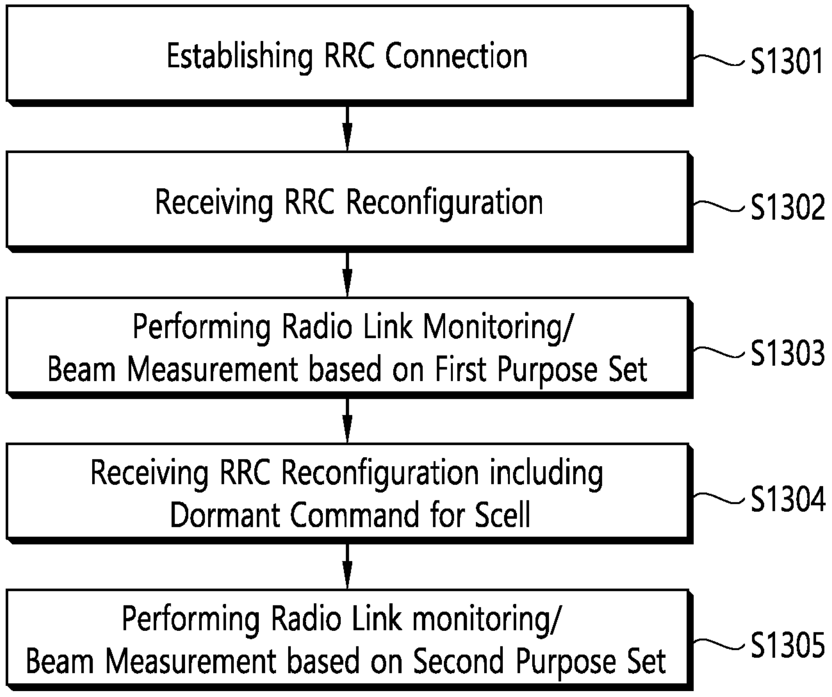
FIG. 13 shows an example for link monitoring in a SCell case, according to some embodiments of the present disclosure.

FIG. 13 shows an example for link monitoring in a SCell case, according to some embodiments of the present disclosure.

In step S1301, the UE may establish RRC Connection on PCell

In step S1302, the UE may receive RRC Reconfiguration including the configuration of SCell.

For example, the UE may receive RRC message for SCell configuration. After applying the SCell configuration, the network may activate SCell and send data transmission not only via PCell but also via SCell. A radio link monitoring RS(s) for radio link monitoring and/or beam measurement may be configured by this RRC Reconfiguration.

In step S1303, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1304, the UE may receive RRC Reconfiguration including dormant command for SCell.

In step S1305, the UE may perform radio link monitoring and/or beam measurement using each RS based on the second purpose set. The second purpose set may be used while the Scell is in the dormant state. The second purpose set may include whether to detect radio link failure only, beam failure only, both, or neither. If the RS is CSI-RS 2 and the purpose is neither, the UE may not perform radio link monitoring and beam measurement using CSI-RS 2.

Figure 14:
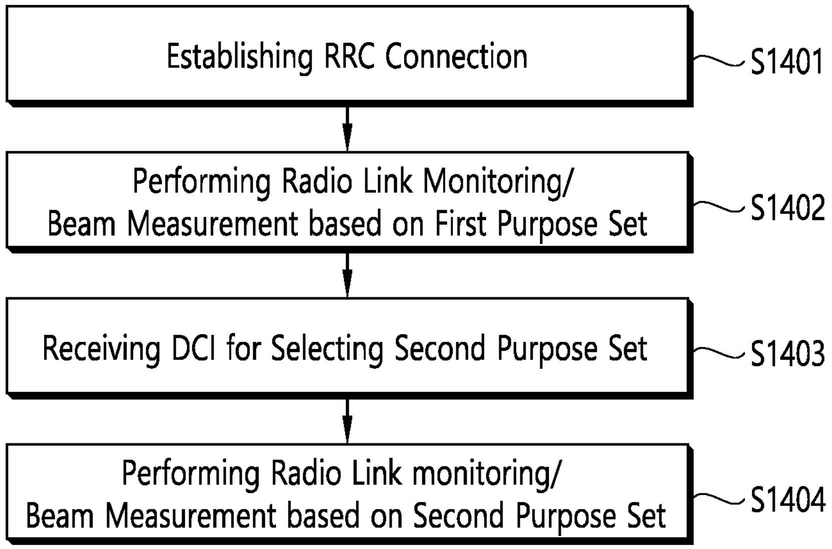
FIG. 14 shows an example for link monitoring in a case of receiving a DCI, according to some embodiments of the present disclosure.

FIG. 14 shows an example for link monitoring in a case of receiving a DCI, according to some embodiments of the present disclosure.

In step S1401, the UE may establish RRC Connection on PCell.

In step S1402, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1403, the UE may receive a DCI for selecting second purpose set.

In step S1404, the UE may perform radio link monitoring and/or beam measurement using each RS based on the second purpose set. The second purpose set may be used upon receiving the indication from the network. The second purpose set may include whether to detect radio link failure only, beam failure only, both, or neither. If the RS is CSI-RS 2 and the purpose is neither, the UE does not perform radio link monitoring and beam measurement using CSI-RS 2.

Figure 15:
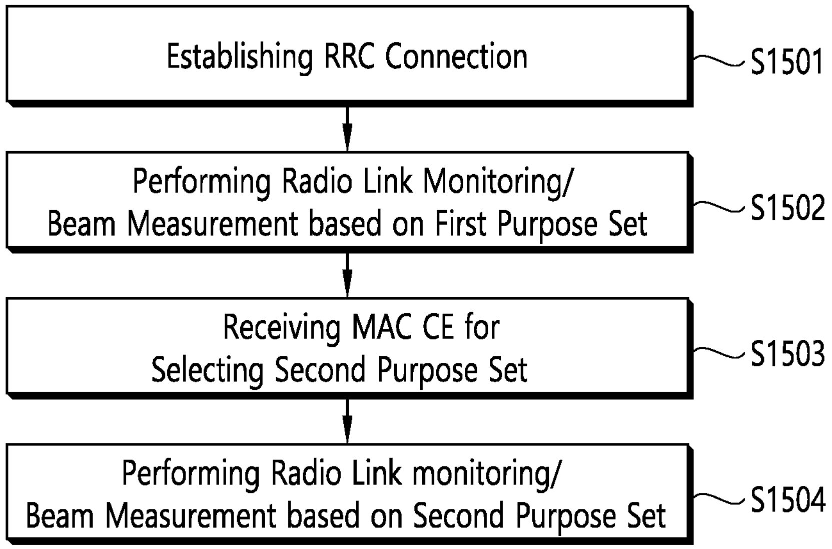
FIG. 15 shows an example for link monitoring in a case of receiving a MAC CE, according to some embodiments of the present disclosure.

FIG. 15 shows an example for link monitoring in a case of receiving a MAC CE, according to some embodiments of the present disclosure.

In step S1501, the UE may establish RRC Connection on PCell.

In step S1502, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1503, the UE may receive a MAC CE for selecting second purpose set.

In step S1504, the UE perform radio link monitoring and/or beam measurement using each RS based on the second purpose set. The second purpose set may be used upon receiving the indication from the network. The second purpose set may include whether to detect radio link failure only, beam failure only, both, or neither. If the RS is CSI-RS 2 and the purpose is neither, the UE does not perform radio link monitoring and beam measurement using CSI-RS 2.

Figure 16:
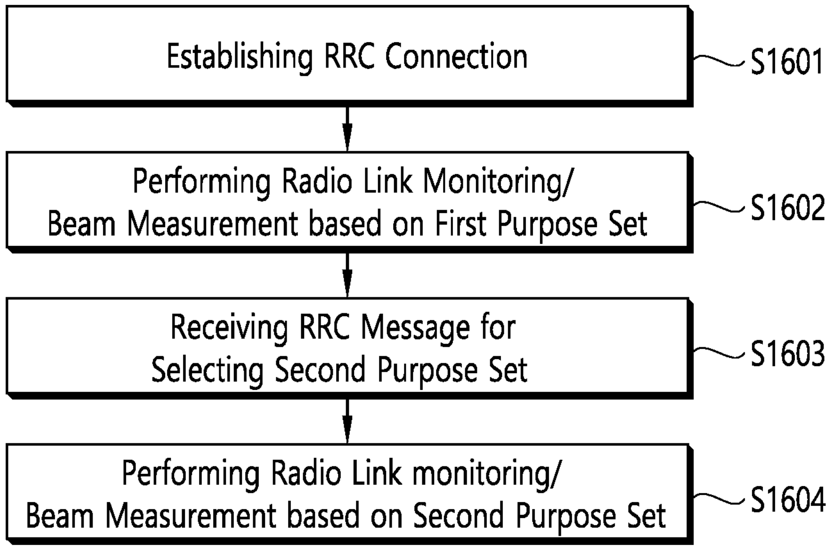
FIG. 16 shows an example for link monitoring in a case of receiving an RRC message, according to some embodiments of the present disclosure.

FIG. 16 shows an example for link monitoring in a case of receiving an RRC message, according to some embodiments of the present disclosure.

In step S1601, the UE may establish RRC Connection on PCell.

In step S1602, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1603, the UE may receive an RRC message for selecting second purpose set.

In step S1604, the UE may perform radio link monitoring and/or beam measurement using each RS based on the second purpose set. The second purpose set may be used upon receiving the indication from the network. The second purpose set may include whether to detect radio link failure only, beam failure only, both, or neither. If the RS is CSI-RS 2 and the purpose is neither, the UE may not perform radio link monitoring and beam measurement using CSI-RS 2.

Figure 17:
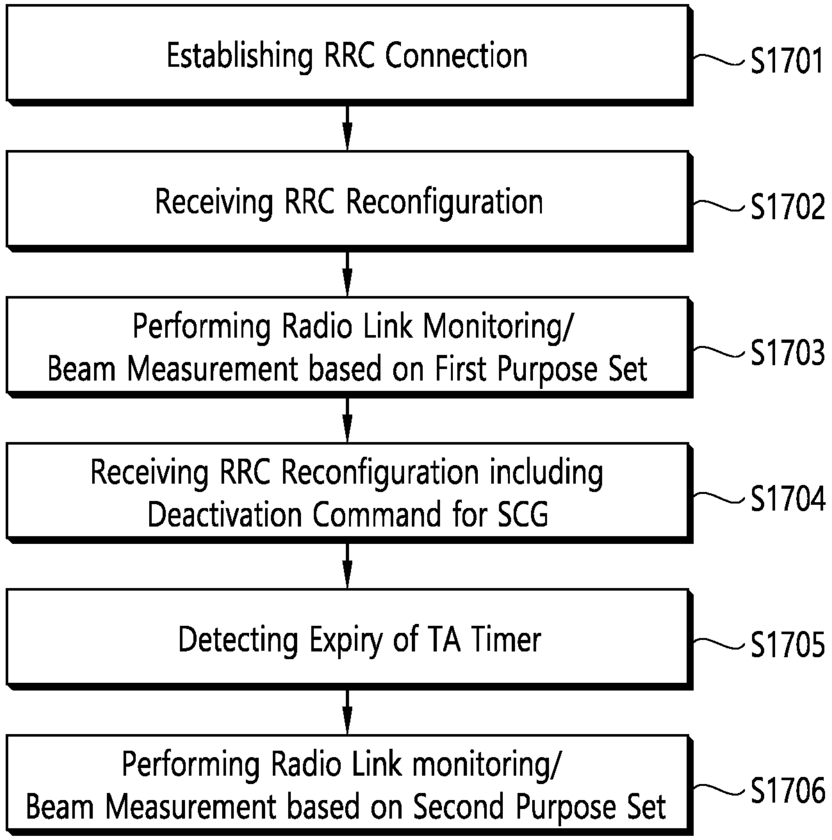
FIG. 17 shows an example for link monitoring in consideration of a deactivated state and TA timer expiry as additional conditions.

FIG. 17 shows an example for link monitoring in consideration of a deactivated state and TA timer expiry as additional conditions.

In step S1701, the UE may establish RRC Connection on PCell.

In step S1702, the UE may receive RRC Reconfiguration including the configuration of dual connectivity.

In step S1703, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1704, the UE may receive RRC Reconfiguration including deactivation command for SCG.

In step S1705, the TA Timer may be expired. In other words, the UE may detect the expiry of the TA timer.

In step S1706, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Figure 18:
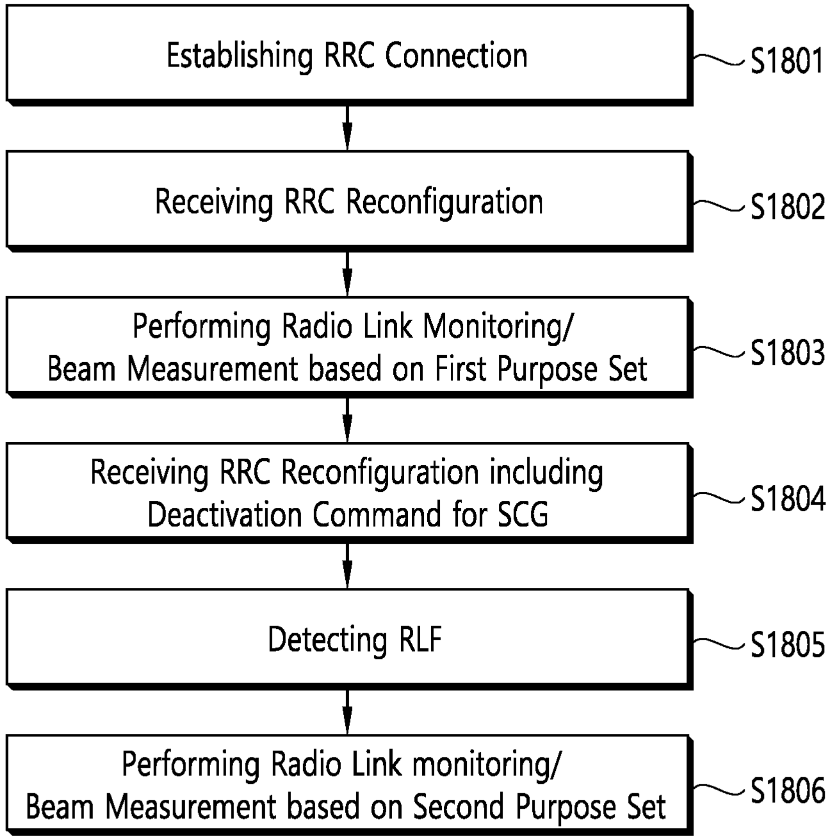
FIG. 18 shows an example for link monitoring in consideration of a deactivated state and RLF detection as additional conditions.

FIG. 18 shows an example for link monitoring in consideration of a deactivated state and RLF detection as additional conditions.

In step S1801, the UE may establish RRC Connection on PCell.

In step S1802, the UE may receive RRC Reconfiguration including the configuration of dual connectivity.

In step S1803, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1804, the UE may receive RRC Reconfiguration including deactivation command for SCG.

In step S1805, the RLF may be detected. In other words, the UE may detect the RLF.

In step S1806, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Figure 19:
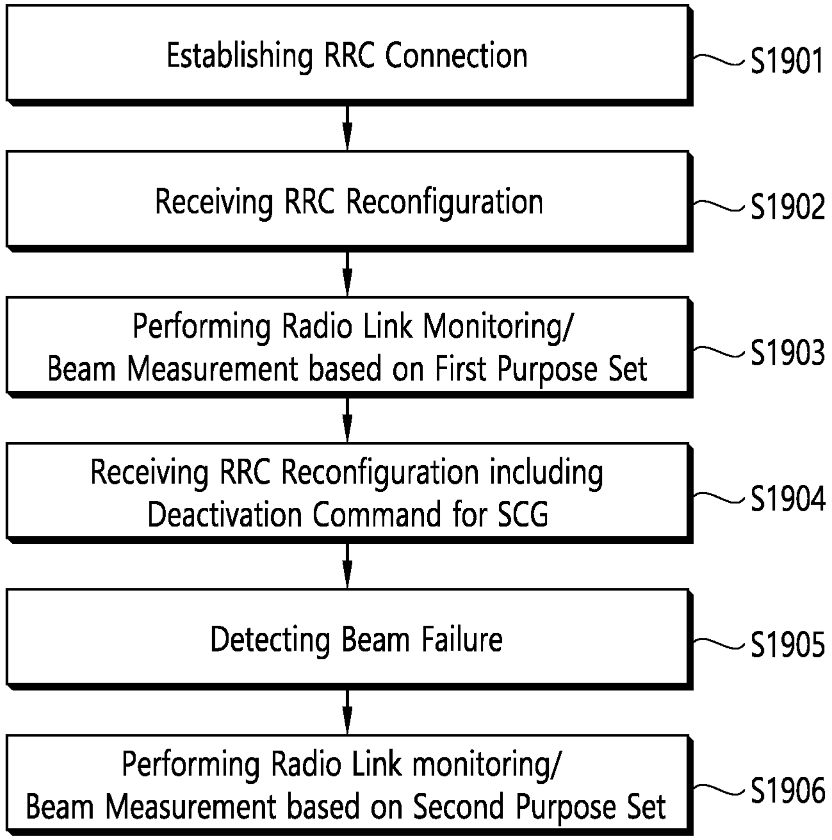
FIG. 19 shows an example for link monitoring in consideration of a deactivated state and Beam Failure detection as additional conditions.

FIG. 19 shows an example for link monitoring in consideration of a deactivated state and Beam Failure detection as additional conditions.

In step S1901, the UE may establish RRC Connection on PCell.

In step S1902, the UE may receive RRC Reconfiguration including the configuration of dual connectivity.

In step S1903, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S1904, the UE may receive RRC Reconfiguration including deactivation command for SCG.

In step S1905, the Beam failure may be detected. In other words, the UE may detect the beam failure.

In step S1906, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Figure 20:
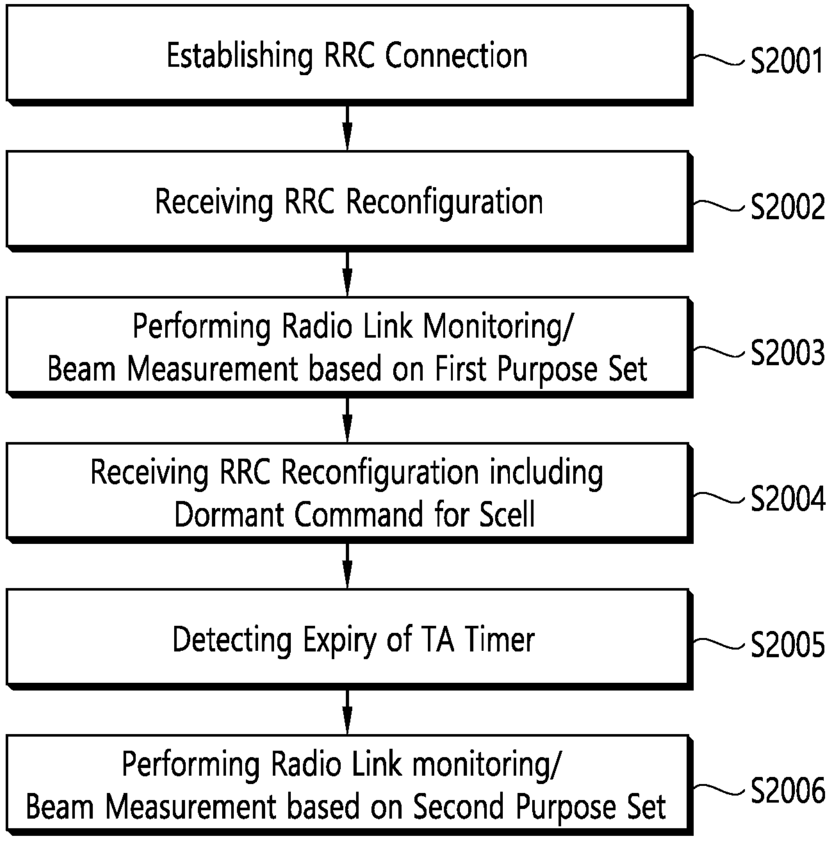
FIG. 20 shows an example for link monitoring in consideration of a dormant state and TA timer expiry as additional conditions.

FIG. 20 shows an example for link monitoring in consideration of a dormant state and TA timer expiry as additional conditions.

In step S2001, the UE may establish RRC Connection on PCell.

In step S2002, the UE may receive RRC Reconfiguration including the configuration of SCell.

In step S2003, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S2004, the UE may receive RRC Reconfiguration including dormant command for Scell.

In step S2005, the TA Timer is expired. In other words, the UE may detect the expiry of the TA timer.

In step S2006, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Figure 21:
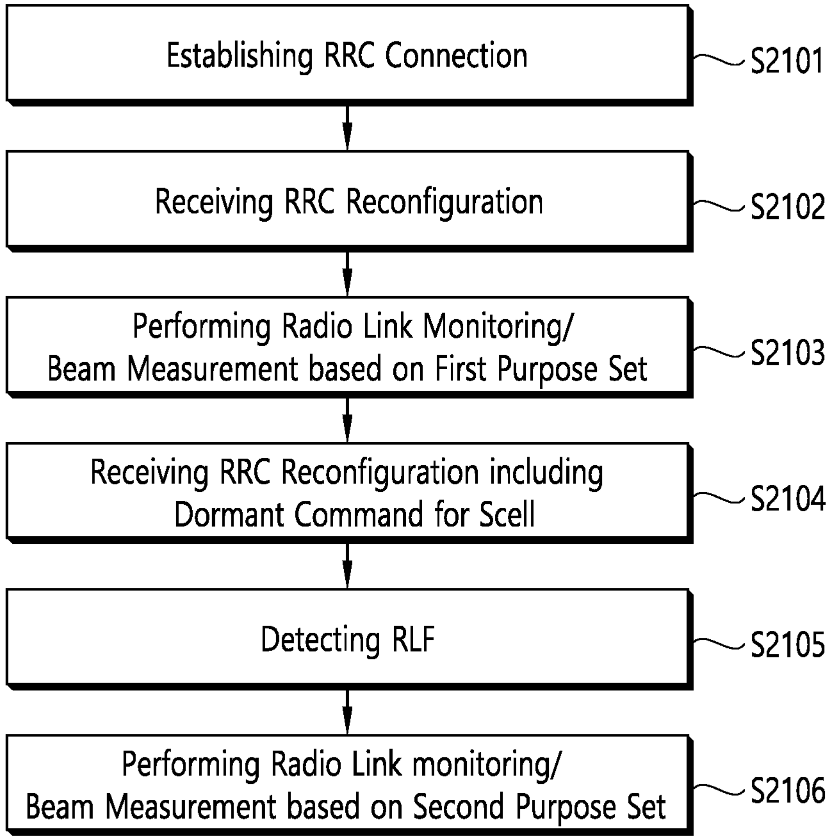
FIG. 21 shows an example for link monitoring in consideration of a dormant state and RLF detection as additional conditions.

FIG. 21 shows an example for link monitoring in consideration of a dormant state and RLF detection as additional conditions.

In step S2101, the UE may establish RRC Connection on PCell.

In step S2102, the UE may receive RRC Reconfiguration including the configuration of Scell.

In step S2103, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S2104, the UE may receive RRC Reconfiguration including dormant command for Scell In step S2105, the RLF may be detected. In other words, the UE may detect the RLF.

In step S2106, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Figure 22:
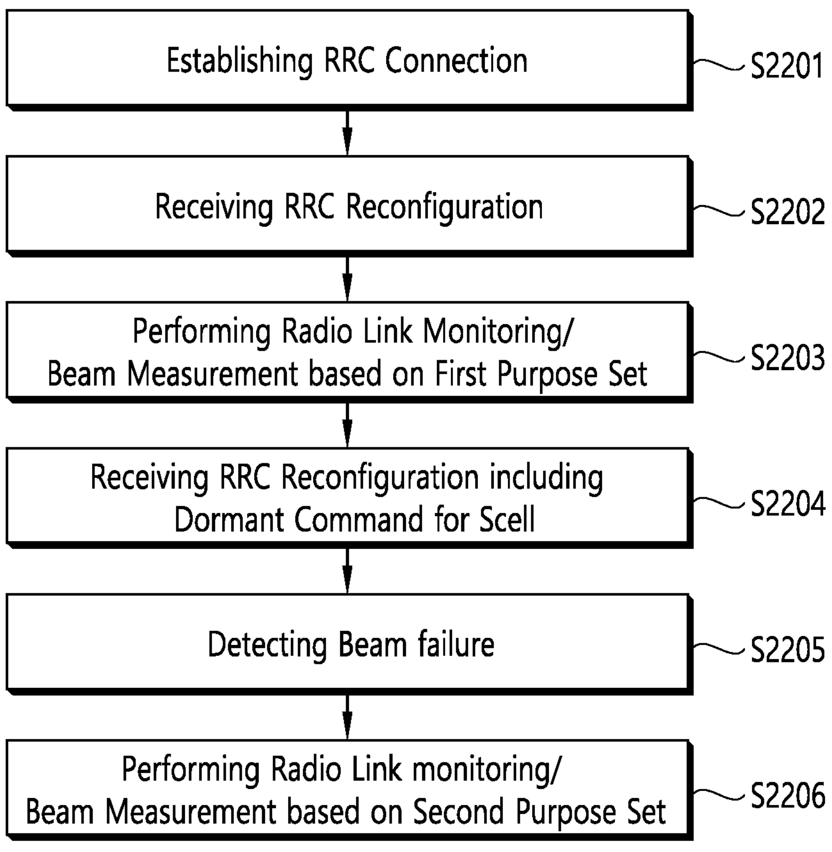
FIG. 22 shows an example for link monitoring in consideration of a dormant state and Beam Failure detection as additional conditions.

FIG. 22 shows an example for link monitoring in consideration of a dormant state and Beam Failure detection as additional conditions.

In step S2202, the UE may establish RRC Connection on PCell.

In step S2202, the UE may receive RRC Reconfiguration including the configuration of Scell.

In step S2203, the UE may perform radio link monitoring and/or beam measurement using each RS based on the first purpose set. The purpose set may include whether to detect radio link failure only, beam failure only, both, or neither. If the RS is SSB2 and first purpose is both, the UE may perform radio link monitoring and beam measure using SSB2.

In step S2204, the UE may receive RRC Reconfiguration including dormant command for Scell.

In step S2205, the Beam failure may be detected. In other words, the UE may detect the Beam failure.

In step S2206, the UE may perform radio link monitoring and/or beam measurement using each RS based on the second purpose set. If the RS is CSI-RS 2 and the purpose is neither, the UE may not perform radio link monitoring and beam measurement using CSI-RS 2.

Some of the detailed steps shown in the examples of FIGS. 10 to 22 may not be essential steps and may be omitted. In addition to the steps shown in FIGS. 10 to 22, other steps may be added, and the order of the steps may vary. Some of the above steps may have their own technical meaning.

Hereinafter, an apparatus for link monitoring in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive a link monitoring configuration for measurements of a cell group. For example, the link monitoring configuration may include (i) a first index of a first radio resource, (ii) a first purpose related to the first radio resource for an activated state, and (iii) a second purpose related to the first radio resource for a deactivated state. The processor 102 may be configured to determine a state of the cell group among the activated state and the deactivated state. The processor 102 may be configured to determine a specific purpose for the first radio resource among the first purpose and the second purpose based on the state of the cell group. The processor 102 may be configured to perform link monitoring for the first radio resource based on the specific purpose. For example, the second purpose may include one of (i) Radio Link Failure (RLF) detection, (ii) Beam Failure (BF) detection, (iii) both the RLF detection and the BF detection, and (iv) neither the RLF detection nor BF detection.

For example, the link monitoring configuration may include (i) a second index of a second radio resource, (ii) a first purpose related to the second radio resource for an activated state, and (iii) a second purpose related to the second radio resource for a deactivated state.

For example, the second purpose related to the first radio resource may be different from the second purpose related to the second radio resource.

For example, the link monitoring configuration may include information on multiple radio resources.

For example, the first purpose may include at least one of (i) RLF detection, (ii) BF detection, and (iii) both the RLF detection and the BF detection.

For example, the first radio resource may include a reference signal or a synchronization signal block (SSB).

For example, the cell group may be a secondary cell group (SCG) or a master cell group (MCG).

For example, the processor 102 may be further configured to control the transceiver 106 to receive a radio resource control (RRC) reconfiguration including a deactivation command for the cell group.

For example, the processor 102 may be further configured to establish an RRC Connection on a primary cell (PCell) for the cell group.

For example, the processor 102 may be further configured to activate the cell group, and perform data transmission via the cell group.

For example, the state of the cell group may be determined as a deactivated state, and the specific purpose for the first radio resource may be determined as the second purpose.

For example, the processor 102 may be further configured to skip the link monitoring for the first radio resource based on the second purpose being "neither".

According to some embodiments of the present disclosure, the processor 102 may be configured to be in communication with at least one of a user equipment, a network, or an autonomous vehicle other than the wireless device.

Hereinafter, a processor for a wireless device for link monitoring in a wireless communication system, according to some embodiments of the present disclosure, will be described.

The processor may be configured to control the wireless device to receive a link monitoring configuration for measurements of a cell group. For example, the link monitoring configuration may include (i) a first index of a first radio resource, (ii) a first purpose related to the first radio resource for an activated state, and (iii) a second purpose related to the first radio resource for a deactivated state. The processor may be configured to control the wireless device to determine a state of the cell group among the activated state and the deactivated state. The processor may be configured to control the wireless device to determine a specific purpose for the first radio resource among the first purpose and the second purpose based on the state of the cell group. The processor may be configured to control the wireless device to perform link monitoring for the first radio resource based on the specific purpose. For example, the second purpose may include one of (i) Radio Link Failure (RLF) detection, (ii) Beam Failure (BF) detection, (iii) both the RLF detection and the BF detection, and (iv) neither the RLF detection nor BF detection.

For example, the link monitoring configuration may include (i) a second index of a second radio resource, (ii) a first purpose related to the second radio resource for an activated state, and (iii) a second purpose related to the second radio resource for a deactivated state.

For example, the second purpose related to the first radio resource may be different from the second purpose related to the second radio resource.

For example, the link monitoring configuration may include information on multiple radio resources.

For example, the first purpose may include at least one of (i) RLF detection, (ii) BF detection, and (iii) both the RLF detection and the BF detection.

For example, the first radio resource may include a reference signal or a synchronization signal block (SSB).

For example, the cell group may be a secondary cell group (SCG) or a master cell group (MCG).

For example, the processor may be configured to control the wireless device to receive a radio resource control (RRC) reconfiguration including a deactivation command for the cell group.

For example, the processor may be configured to control the wireless device to establish an RRC Connection on a primary cell (PCell) for the cell group.

For example, the processor may be configured to control the wireless device to activate the cell group, and perform data transmission via the cell group.

For example, the state of the cell group may be determined as a deactivated state, and the specific purpose for the first radio resource may be determined as the second purpose.

For example, the processor may be configured to control the wireless device to skip the link monitoring for the first radio resource based on the second purpose being "neither".

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for link monitoring in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory. ROM memory. EPROM memory. EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive a link monitoring configuration for measurements of a cell group. For example, the link monitoring configuration may include (i) a first index of a first radio resource. (ii) a first purpose related to the first radio resource for an activated state, and (iii) a second purpose related to the first radio resource for a deactivated state. The stored a plurality of instructions may cause the wireless device to determine a state of the cell group among the activated state and the deactivated state. The stored a plurality of instructions may cause the wireless device to determine a specific purpose for the first radio resource among the first purpose and the second purpose based on the state of the cell group. The stored a plurality of instructions may cause the wireless device to perform link monitoring for the first radio resource based on the specific purpose. For example, the second purpose may include one of (i) Radio Link Failure (RLF) detection, (ii) Beam Failure (BF) detection, (iii) both the RLF detection and the BF detection, and (iv) neither the RLF detection nor BF detection.

For example, the link monitoring configuration may include (i) a second index of a second radio resource, (ii) a first purpose related to the second radio resource for an activated state, and (iii) a second purpose related to the second radio resource for a deactivated state.

For example, the second purpose related to the first radio resource may be different from the second purpose related to the second radio resource.

For example, the link monitoring configuration may include information on multiple radio resources.

For example, the first purpose may include at least one of (i) RLF detection, (ii) BF detection, and (iii) both the RLF detection and the BF detection.

For example, the first radio resource may include a reference signal or a synchronization signal block (SSB).

For example, the cell group may be a secondary cell group (SCG) or a master cell group (MCG).

For example, the stored a plurality of instructions may cause the wireless device to receive a radio resource control (RRC) reconfiguration including a deactivation command for the cell group.

For example, the stored a plurality of instructions may cause the wireless device to establish an RRC Connection on a primary cell (PCell) for the cell group.

For example, the stored a plurality of instructions may cause the wireless device to activate the cell group, and perform data transmission via the cell group.

For example, the state of the cell group may be determined as a deactivated state, and the specific purpose for the first radio resource may be determined as the second purpose.

For example, the stored a plurality of instructions may cause the wireless device to skip the link monitoring for the first radio resource based on the second purpose being "neither".

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for link monitoring in a wireless communication system, according to some embodiments of the present disclosure, will be described.

The BS may transmit, to a wireless device, a link monitoring configuration for measurements of a cell group.

For example, the link monitoring configuration may include (i) a first index of a first radio resource, (ii) a first purpose related to the first radio resource for an activated state, and (iii) a second purpose related to the first radio resource for a deactivated state.

For example, the second purpose may include one of (i) Radio Link Failure (RLF) detection, (ii) Beam Failure (BF) detection, (iii) both the RLF detection and the BF detection, and (iv) neither the RLF detection nor BF detection.

Hereinafter, a base station (BS) for link monitoring in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a link monitoring configuration for measurements of a cell group.

For example, the link monitoring configuration may include (i) a first index of a first radio resource, (ii) a first purpose related to the first radio resource for an activated state, and (iii) a second purpose related to the first radio resource for a deactivated state.

For example, the second purpose may include one of (i) Radio Link Failure (RLF) detection, (ii) Beam Failure (BF) detection, (iii) both the RLF detection and the BF detection, and (iv) neither the RLF detection nor BF detection.

The present disclosure can have various advantageous effects.

According to some embodiments of the present disclosure, a wireless device could save power by performing selective link monitoring.

For example, the selective resource set(s) (for example, the selective reference signal(s)) for deactivated SCG may be beneficial for power saving.

In other words, the UE may selectively perform monitoring or measurement radio resource(s), and may not perform monitoring and measurement radio resource(s) depending on the purpose.

In particular, from the RRC signaling point of view, configuring two purposes of each radio resource used according to a UE state or a network command(s) could be more efficient than configuring multiple radio resource sets (or multiple reference signal sets) for multiple purposes.

That is, according to the present disclosure, in deactivated state, power-saving could be possible by reducing the number of beam failure (BF) detection and/or radio link failure (RLF) detection.

According to some embodiments of the present disclosure, a wireless communication system could provide an efficient solution for selective link monitoring.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising:

receiving, by a wireless device, a link monitoring configuration for measurements of a cell group, wherein the link monitoring configuration includes a Reference Signal (RS) list including first information related to a first RS, wherein the first information related to the first RS includes (i) a first purpose for the first RS for an activated state, (ii) a second purpose for the first RS for a deactivated state, and (iii) information related to a first detection resource including a Synchronization Signal PBCH Block (SSB)-index or a channel state information (csi)-RS-index;

based on determining that the cell group is activated:

performing, by the wireless device, measurements for the first detection resource based on the first purpose, wherein the first purpose for the first RS is one of (i) Radio Link Failure (RLF) detection, (ii) Beam Failure (BF) detection, or (iii) both the RLF detection and the BF detection;

based on determining that the cell group is deactivated:

skipping, by the wireless device, measurements for the first detection resource based on the second purpose, wherein the second purpose for the first RS is neither the RLF detection nor BF detection.

2. The method of claim 1, wherein the RS list includes second information related to a second RS, wherein the second information related to the second RS includes (i) a first purpose for the second RS an activated state, (ii) a second purpose for the second RS a deactivated state, and (iii) information related to a second detection resource including an SSB-index or a csi-RS-index.

3. The method of claim 2, wherein the method further comprising:

based on determining that the cell group is deactivated:

performing, by the wireless device, measurements for the second detection resource based on the second purpose, wherein the second purpose for the second RS is one of (i) RLF detection, (ii) BF detection, or (iii) both the RLF detection and the BF detection.

4. The method of claim 1, wherein the first RS includes a csi-RS or an SSB.

5. The method of claim 1, wherein the cell group is a secondary cell group (SCG) or a master cell group (MCG).

6. The method of claim 1, wherein the method further comprises, receiving, by the wireless device, a radio resource control (RRC) reconfiguration including a deactivation command for the cell group.

7. The method of claim 1, wherein the method further comprises, establishing, by the wireless device, an RRC Connection on a primary cell (PCell) for the cell group.

8. The method of claim 1, wherein the method further comprises, based on determining that the cell group is activated:

performing, by the wireless device, data transmission via the cell group.

9. The method of claim 1, wherein the wireless device is in communication with at least one of a user equipment, a network, or an autonomous vehicle other than the wireless device.

10. A wireless device, comprising:

a transceiver;

a memory; and at least one processor operatively coupled to the transceiver and the memory, and configured to perform operations, the operations comprising:

receiving a link monitoring configuration for measurements of a cell group, wherein the link monitoring configuration includes a Reference Signal (RS) list including first information related to a first RS, wherein the first information related to the first RS includes (i) a first purpose for the first RS for an activated state, (ii) a second purpose for the first RS for a deactivated state, and (iii) information related to a first detection resource including a Synchronization Signal PBCH Block (SSB)-index or a channel state information (csi)-RS-index;

based on determining that the cell group is activated:

performing measurements for the first detection resource based on the first purpose, wherein the first purpose for the first RS is one of (i) Radio Link Failure (RLF) detection, (ii) Beam Failure (BF) detection, or (iii) both the RLF detection and the BF detection;

based on determining that the cell group is deactivated:

skipping measurements for the first detection resource based on the second purpose, wherein the second purpose for the first RS is neither the RLF detection nor BF detection.

11. The wireless device of claim 10, wherein the RS list includes second information related to a second RS, wherein the second information related to the second RS includes (i) a first purpose for the second RS an activated state, (ii) a second purpose for the second RS a deactivated state, and (iii) information related to a second detection resource including an SSB-index or a csi-RS-index.

12. The wireless device of claim 11, wherein the operations further comprising:

based on determining that the cell group is deactivated:

performing, by the wireless device, measurements for the second detection resource based on the second purpose, wherein the second purpose for the second RS is one of (i) RLF detection, (ii) BF detection, or (iii) both the RLF detection and the BF detection.

13. The wireless device of claim 10, wherein the first RS includes a csi-RS or an SSB.

* * * * *